US009398260B2

(12) United States Patent
Kondo

(10) Patent No.: US 9,398,260 B2
(45) Date of Patent: Jul. 19, 2016

(54) TELECONFERENCE SYSTEM, STORAGE MEDIUM STORING PROGRAM FOR SERVER APPARATUS, AND STORAGE MEDIUM STORING PROGRAM FOR TERMINAL APPARATUS

(71) Applicant: Brother Kogyo Kabushiki Kaisha, Nagoya-shi, Aichi-ken (JP)

(72) Inventor: Yoshiyuki Kondo, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/811,124

(22) Filed: Jul. 28, 2015

(65) Prior Publication Data

US 2016/0028996 A1    Jan. 28, 2016

(30) Foreign Application Priority Data

Jul. 28, 2014   (JP) ................................ 2014-152900

(51) Int. Cl.
*H04N 7/14* (2006.01)
*H04N 7/15* (2006.01)

(52) U.S. Cl.
CPC ............... *H04N 7/152* (2013.01); *H04N 7/155* (2013.01)

(58) Field of Classification Search
USPC ................. 348/14.09, 14.12, E07.084, 14.08, 348/14.01, 14.1, 211.12; 379/93.21, 158, 379/202.01, 205.01
See application file for complete search history.

(56) References Cited

U.S. PATENT DOCUMENTS

| 8,705,766 | B2 | 4/2014 | Takanezawa | |
|---|---|---|---|---|
| 2002/0188731 | A1 | 12/2002 | Potekhin et al. | |
| 2009/0226008 | A1 | 9/2009 | Takanezawa | |
| 2012/0206564 | A1 | 8/2012 | Potekhin et al. | |
| 2013/0227015 | A1* | 8/2013 | Mihara | G06F 17/30194 709/204 |
| 2014/0118476 | A1* | 5/2014 | Nagase | H04N 7/15 348/14.12 |

FOREIGN PATENT DOCUMENTS

| JP | H-05037933 A | 2/1993 |
|---|---|---|
| JP | H-05292494 A | 11/1993 |
| JP | 4231698 B2 | 3/2009 |
| JP | 2009-212852 A | 9/2009 |

* cited by examiner

*Primary Examiner* — Yosef K Laekemariam
(74) *Attorney, Agent, or Firm* — Banner & Witcoff, Ltd.

(57) ABSTRACT

A program for teleconference includes a first storing instruction of storing conference information, terminal information, and process information in association with each other, an audio acquiring instruction of acquiring audio data transmitted from a first terminal apparatus through a session established with a first conference process executed by the first terminal apparatus in response to a connection request, and an audio transmission controlling instruction of transmitting the audio data through a session established with a second conference process executed by a second terminal apparatus identified by second terminal information without transmitting the audio data through a session established with a third conference process executed by the first terminal apparatus. The second conference process is identified by second process information associated with the second terminal information in the storage area. The third conference process is identified by third process information associated with the first terminal information in the storage area.

7 Claims, 10 Drawing Sheets

FIG. 2

| CONFERENCE ID | TERMINAL ID | PROCESS ID | AUDIO SESSION ID | VIDEO SESSION ID |
|---|---|---|---|---|
| 1234 | PC B | Process3 | Audio3 | Video3 |
| | PC B | Process4 | Audio4 | Video4 |
| | PC C | Process5 | Audio5 | Video5 |
| | PC C | Process6 | Audio6 | Video6 |
| | PC A | Process1 | Audio1 | Video1 |

ADD

| CONFERENCE ID | TERMINAL ID | PROCESS ID | AUDIO SESSION ID | VIDEO SESSION ID |
|---|---|---|---|---|
| 1234 | PC B | Process3 | Audio3 | Video3 |
| | PC B | Process4 | Audio4 | Video4 |
| | PC C | Process5 | Audio5 | Video5 |
| | PC C | Process6 | Audio6 | Video6 |
| | PC A | Process1 | Audio1 | Video1 |
| | PC A | Process2 | Audio2 | Video2 |

DELETE

| CONFERENCE ID | TERMINAL ID | PROCESS ID | AUDIO SESSION ID | VIDEO SESSION ID |
|---|---|---|---|---|
| 1234 | PC B | Process3 | Audio3 | Video3 |
| | PC B | Process4 | Audio4 | Video4 |
| | PC C | Process5 | Audio5 | Video5 |
| | PC C | Process6 | Audio6 | Video6 |
| | PC A | Process2 | Audio2 | Video2 |

FIG. 12

| CONFERENCE ID | TERMINAL ID |
|---|---|
| 1234 | PC B |
| | PC C |

TELECONFERENCE SYSTEM, STORAGE MEDIUM STORING PROGRAM FOR SERVER APPARATUS, AND STORAGE MEDIUM STORING PROGRAM FOR TERMINAL APPARATUS

CROSS REFERENCE TO RELATED APPLICATIONS

This application claims priority from Japanese Patent Application No. 2014-152900 filed Jul. 28, 2014. The entire content of the priority application is incorporated herein by reference.

TECHNICAL FIELD

This disclosure relates to a teleconference system including a plurality of terminal apparatuses and a server apparatus, a storage medium storing a program executable on a server apparatus, and a storage medium storing a program executable on a terminal apparatus.

BACKGROUND

Technology for teleconference through a network is known. For example, a multipoint image communication method is disclosed. The multipoint image communication method is realized by a plurality of communication terminal apparatuses and a multipoint connection apparatus. Each communication terminal apparatus includes a plurality of television cameras. Each communication terminal apparatus multiplexes image signals from the plurality of television cameras and transmits the image signals to the multipoint connection apparatus. At this time, effective channel information is also transmitted. The multipoint connection apparatus notifies each communication terminal apparatus about the effective channel information of other communication terminal apparatuses. Each communication terminal apparatus selects an effective channel needed for processing a teleconference from the other communication terminal apparatuses and their effective channels, and inputs the effective channel through a display operation unit. This selection information is transmitted to the multipoint connection apparatus. In the multipoint connection apparatus, image signals of the effective channel are multiplexed. In each communication terminal apparatus, multiplex image signals from the multipoint connection apparatus are separated and displayed on a monitor.

SUMMARY

According to one aspect, this specification discloses a teleconference system including a plurality of terminal apparatuses configured to be used for a teleconference, and a server apparatus configured to execute the teleconference. Each of the plurality of terminal apparatuses includes: a first communicator configured to connect to a network; a first processor; and a first memory storing instructions, the instructions, when executed by the first processor, causing the first processor to perform: a first acquiring operation of acquiring conference information for identifying a teleconference to be connected; a second acquiring operation of acquiring terminal information for identifying a terminal apparatus itself in the teleconference identified by the conference information acquired by the first acquiring operation; a third acquiring operation of acquiring process information for identifying a conference process executed by the terminal apparatus itself; a first transmission controlling operation of transmitting a connection request from the first communicator to the server apparatus, the connection request including the conference information, the terminal information, and the process information, the connection request being a request for connecting to the teleconference identified by the conference information; and a second transmission controlling operation of transmitting audio data from the first communicator to the server apparatus through a session established, in response to the connection request, between the conference process and the server apparatus, the audio data corresponding to sound collected by a sound collector of the terminal apparatus itself. The server apparatus includes: a second communicator configured to connect to the network; a second processor; and a second memory storing instructions, the instructions, when executed by the second processor, causing the second processor to perform: a first storing operation of storing the conference information, the terminal information, and the process information in the second memory in association with each other, the conference information, the terminal information, and the process information being included in the connection request transmitted from each of the plurality of terminal apparatuses, the terminal information being for identifying a terminal apparatus that is a transmission source of the connection request; a fourth acquiring operation of acquiring, through the second communicator, the audio data transmitted from a first terminal apparatus through a session established with a first conference process executed by the first terminal apparatus in response to the connection request from the first terminal apparatus, the first conference process being identified by first process information, and the first terminal apparatus being one of the plurality of terminal apparatuses and being identified by first terminal information; and a third transmission controlling operation of transmitting, from the second communicator, the audio data through a session established with a second conference process executed by a second terminal apparatus identified by second terminal information without transmitting the audio data through a session established with a third conference process executed by the first terminal apparatus, the second conference process being identified by second process information associated with the second terminal information in the second memory, the third conference process being identified by third process information associated with the first terminal information in the second memory, the first, second and third process information being different from each other, the second terminal apparatus being one of the plurality of terminal apparatuses and different from the first terminal apparatus, and the first and second terminal information being associated with same conference information in the second memory.

According to another aspect, this specification also discloses a non-transitory computer-readable storage medium storing a program executable on a server apparatus configured to be connected to a network and configured to execute a teleconference conducted by a plurality of terminal apparatuses via the network. The program includes: a first storing instruction of storing conference information, terminal information, and process information in a storage area connected to the server apparatus in association with each other, the conference information, the terminal information, and the process information being included in a connection request transmitted from each of the plurality of terminal apparatuses, the conference information being for identifying a teleconference to be connected, the terminal information being for identifying a terminal apparatus that is a transmission source of the connection request, and the process information being for identifying a conference process executed by each of the plurality of terminal apparatuses; an audio acquiring instruction of acquiring, through a communicator of the server apparatus connected to the network, the audio data transmitted from a first terminal apparatus through a session established with a first conference process executed by the first terminal apparatus in response to the connection request from the first terminal apparatus, the first conference process being identified by first process information, and the first terminal apparatus being one of the plurality of terminal apparatuses and being identified by first terminal information; and an audio transmission controlling instruction of transmitting, from the communicator, the audio data through a session established with a second conference process executed by a second terminal apparatus identified by second terminal information without transmitting the audio data through a session established with a third conference process executed by the first terminal apparatus, the second conference process being identified by second process information associated with the second terminal information in the storage area, the third conference process being identified by third process information associated with the first terminal information in the storage area, the first, second and third process information being different from each other, the second terminal apparatus being one of the plurality of terminal apparatuses and different from the first terminal apparatus, and the first and second terminal information being associated with the conference information in the storage area.

According to still another aspect, this specification also discloses a non-transitory computer-readable storage medium storing a program executable on a terminal apparatus configured to be connected to a network and used for a teleconference that is executed by a server apparatus via the network. The program includes: a first acquiring instruction of acquiring conference information for identifying a teleconference to be connected; a second acquiring instruction of acquiring terminal information for identifying a terminal apparatus itself in the teleconference identified by the conference information acquired by the first acquiring instruction; a third acquiring instruction of acquiring process information for identifying a conference process executed by the terminal apparatus itself; a first transmission controlling instruction of transmitting a connection request from a communicator of the terminal apparatus itself connected to the network to the server apparatus, the connection request including the conference information, the terminal information, and the process information, the connection request being a request for connecting to the teleconference identified by the conference information; and a second transmission controlling instruction of transmitting audio data from the communicator to the server apparatus through a session established, in response to the connection request, between the conference process and the server apparatus, the audio data corresponding to sound collected by a sound collector of the terminal apparatus itself.

BRIEF DESCRIPTION OF THE DRAWINGS

Embodiments in accordance with this disclosure will be described in detail with reference to the following figures wherein:

FIG. 2 are tables showing an example of a participant list in which a change from an upper table to a middle table shows addition of an ID to the participant list, and a change from the middle table to a lower table shows deletion of an ID from the participant list;

FIG. 12 is a diagram showing an example of an audio transfer list; and

DETAILED DESCRIPTION

In a terminal apparatus operated by a user who participates in a teleconference with a teleconference counterpart who operates one or a plurality of counterpart apparatus, a teleconference program is executed when conducting the teleconference. A specification is conceived that one process by this program deals with a video picture captured by one camera out of cameras provided at the apparatus itself. In this specification, the inventor conceived that a plurality of programs for terminal apparatus is started in one terminal apparatus having a plurality of cameras and connects to the same teleconference. Each process after starting the program deals with a video picture captured by respective cameras. In this case, from the server apparatus executing the teleconference, teleconferences process executed concurrently in one terminal apparatus are treated as different connection targets. Hence, in the above-mentioned one terminal apparatus, it is unnecessary to multiplex each video picture captured by a plurality of cameras. Accordingly, for example, even if processing power of the terminal apparatus is not very high, a similar function to that of the above-mentioned prior art can be obtained.

As described above, if a plurality of teleconference processes executed in one terminal apparatus connects to the same teleconference, from the server apparatus, the plurality of teleconference processes is treated as different connection targets. Hence, audio data transmitted by a first teleconference process is acquired and played by second and following teleconference processes. For example, after that, the user of this terminal apparatus hears his or her own voice at delayed timing.

An example of an object of one aspect of this disclosure is to provide a teleconference system, a program for a server apparatus, and a program for a terminal apparatus that control output and non-output of sound, in a case where a plurality of programs for terminal apparatus is started and a plurality of teleconference processes is executed in one terminal apparatus in a teleconference.

Some aspects of the disclosure will be described while referring to the accompanying drawings. The disclosure is not limited to configurations described below, and may adopt various configuration in the same technical idea. For example, a part of the configuration shown below may be omitted or substituted with another configuration, and so on. Further, another configuration may be included.

<Teleconference System>

Figure 1:
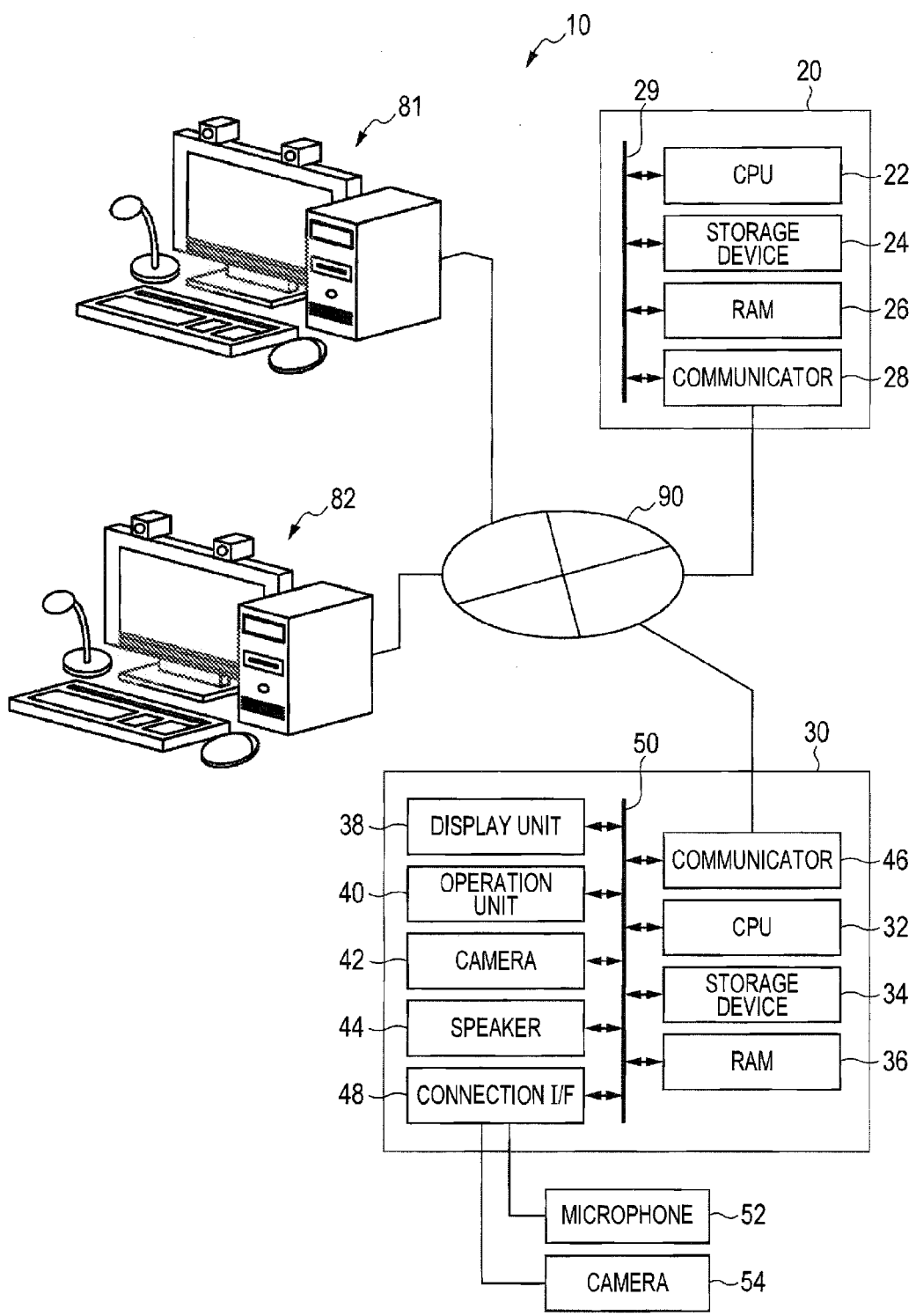
FIG. 1 is a diagram showing an example of a teleconference system.
Figure 3:
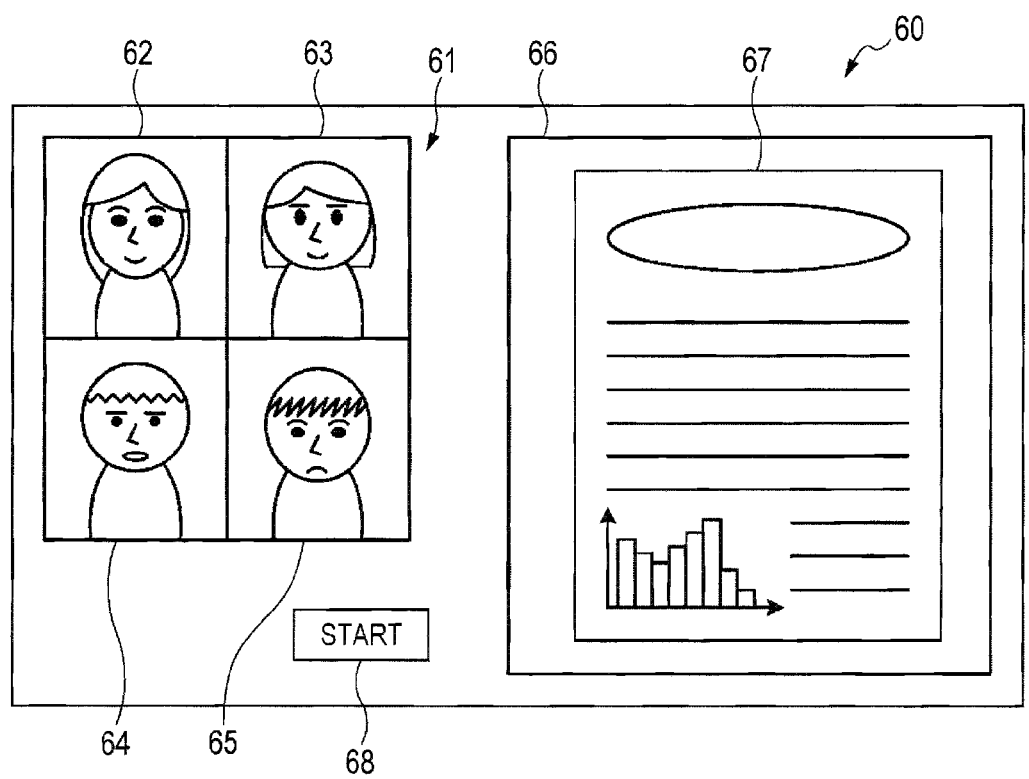
FIG. 3 is a diagram showing an example of a teleconference screen.

A teleconference system 10 will be described while referring to FIGS. 1 to 3. As shown in FIG. 1, the teleconference system 10 includes a server apparatus 20, a terminal apparatus 30, and two counterpart apparatuses 81, 82. In the following description, a teleconference performed by the terminal apparatus 30 and the two counterpart apparatuses 81, 82 is described as an example. That is, it is assumed that the terminal apparatus 30 and the counterpart apparatuses 81, 82 connect to the same teleconference identified by a particular conference ID. The teleconference by the teleconference system 10 may be performed by the terminal apparatus 30 and one counterpart apparatus, or by the terminal apparatus 30 and three or more counterpart apparatuses. The conference ID is conference room information for identifying a teleconference performed by the terminal apparatus 30 and the counterpart apparatuses 81, 82.

In a teleconference identified by a conference ID, the terminal apparatus 30 and the counterpart apparatuses 81, 82 are identified by terminal information (e.g., terminal IDs). In the embodiment, each terminal ID of the terminal apparatus 30 and the counterpart apparatuses 81, 82 is as follows. The terminal ID of the terminal apparatus 30 is "PC A". The terminal ID of the counterpart apparatus 81 is "PC B". The terminal ID of the counterpart apparatus 82 is "PC C".

The server apparatus 20, the terminal apparatus 30, and the counterpart apparatuses 81, 82 are connected to a network 90. For example, the network 90 is a network such as Internet. In the teleconference system 10, a teleconference by the terminal apparatus 30 and the counterpart apparatuses 81, 82 is performed by way of the server apparatus 20. That is, the server apparatus 20 performs a teleconference of the terminal apparatus 30 and the counterpart apparatuses 81, 82.

The terminal apparatus 30 and the counterpart apparatuses 81, 82 are communication apparatuses having a communication function through the network 90. The terminal apparatus 30 and the counterpart apparatuses 81, 82 are communication apparatuses such as personal computers. Or, the terminal apparatus 30 and the counterpart apparatuses 81, 82 may be communication apparatuses such as smartphones and tablet devices. The configuration of the terminal apparatus 30 will be described later. The term "counterpart apparatus" is used merely for distinguishing the counterpart apparatuses 81, 82 from the terminal apparatus 30, in embodiments in which the terminal apparatus 30 is described mainly. The counterpart apparatuses 81, 82 also perform processes and realize functions that are similar to those of the terminal apparatus 30 described later. The descriptions for the counterpart apparatuses 81, 82 are omitted appropriately.

The terminal apparatus 30 receives operations targeted at URL of the server apparatus 20. In accordance with this URL, the terminal apparatus 30 accesses the server apparatus 20. This causes a program at the client side to be started. In the embodiment, a teleconference program at the client side is referred to as "client program". A start command for starting the client program includes specifying information of an execution file, specifying information of the server apparatus 20, and specifying information of a conference ID. For example, a start command is defined as "ABCJoin.exe/Server=Japan1.ABCJoin.com/Meeting=1234". A command "ABCJoin.exe" is specifying information that specifies an execution file. A command "Server=Japan1.ABCJoin.com" is specifying information that specifies the server apparatus 20. A command "Meeting=1234" is specifying information that specifies a conference ID. When the client program is started by the start command, in the terminal apparatus 30, a process by the started client program becomes active. In the embodiment, the process by the client program is referred to as "conference process". The conference process being executed by the terminal apparatus 30 becomes a state in which the conference process is connected to a teleconference identified by a conference ID executed by the server apparatus 20. That is, between conference processes of the server apparatus 20 and the terminal apparatus 30, an audio session for communication of audio data and a video session for communication of video data are established. For example, a first port number is assigned to the video session, and a second port number, which is different from the first port number, is assigned to the audio session.

In the teleconference system 10, a plurality of client programs can be started in each communication apparatus of the terminal apparatus 30 and the counterpart apparatuses 81, 82. In this case, in each communication apparatus, the number of conference processes corresponding to the number of started programs is executed. For example, assume that two cameras 42 and 54 (described later) having different shooting ranges are provided at the terminal apparatus 30. In the terminal apparatus 30, the client program can be started twice so as to execute two conference processes. One of the two conference processes corresponds to the camera 42. The other one of the two conference processes corresponds to the camera 54. Accordingly, in each video session of the two conference processes, different video data captured by each of the cameras 42 and 54 are transmitted to the server apparatus 20.

Although details are omitted, in a similar manner to the terminal apparatus 30, conference processes executed in each of the counterpart apparatuses 81, 82 are connected to the server apparatus 20. Between conference processes in each of the server apparatus 20 and the counterpart apparatuses 81, 82, audio session for communication of audio data and video session for communication of video data are established. As described above, in each of the counterpart apparatuses 81, 82, as well, a plurality of client programs can be started so as to execute a plurality of conference processes at the same time.

In the teleconference identified by the conference ID, the conference processes executed by the terminal apparatus 30 and the counterpart apparatuses 81, 82 are identified by process IDs. The process ID is example of process information for identifying a conference process. Audio sessions established in the conference processes executed by the terminal apparatus 30 and the counterpart apparatuses 81, 82 are identified by audio session IDs. The audio session ID is information for identifying an audio session. Video sessions established in the conference processes executed by the terminal apparatus 30 and the counterpart apparatuses 81, 82 are identified by video session IDs. The video session ID is information for identifying a video session.

FIG. 1 shows a configuration in which each communication apparatus of the terminal apparatus 30 and the counterpart apparatuses 81, 82 has two cameras. Note that the number of cameras provided at each communication apparatus may be one or three or more. Further, the number of cameras provided at each communication apparatus may be different numbers from each other.

In the server apparatus 20, a participant list is stored. As shown in FIG. 2, the participant list is a list in which terminal IDs, process IDs, audio session IDs, and video session IDs are stored in association with a conference ID. In the participant list, one or a plurality of process ID, audio session ID, and video session ID are associated with the same terminal ID. For example, in a case where there are two conference processes in each communication apparatus of the terminal apparatus 30 and the counterpart apparatuses 81, 82, the state of the participant list in the teleconference identified by the conference ID "1234" is shown in FIG. 2. The process IDs, the audio session IDs, and the video session IDs stored in the participant list shown in FIG. 2 are as follows.

A process ID "Process3" is a process ID for identifying a third conference process executed in the counterpart apparatus 81. An audio session ID "Audio3" is an audio session ID for identifying an audio session by the third conference process. A video session ID "Video3" is a video session ID for identifying a video session by the third conference process. A process ID "Process4" is a process ID for identifying a fourth conference process executed in the counterpart apparatus 81. An audio session ID "Audio4" is an audio session ID for identifying an audio session by the fourth conference process. A video session ID "Video4" is a video session ID for identifying a video session by the fourth conference process.

A process ID "Process5" is a process ID for identifying the fifth conference process executed in the counterpart apparatus 82. An audio session ID "Audio5" is an audio session ID for identifying an audio session by the fifth conference process. A video session ID "Video5" is a video session ID for identifying a video session by the fifth conference process. A process ID "Process6" is a process ID for identifying a sixth conference process executed in the counterpart apparatus 82. An audio session ID "Audio6" is an audio session ID for identifying an audio session by the sixth conference process. A video session ID "Video6" is a video session ID for identifying a video session by the sixth conference process.

A process ID "Process1" is a process ID for identifying a first conference process executed in the terminal apparatus 30. An audio session ID "Audio1" is an audio session ID for identifying an audio session by the first conference process. A video session ID "Video1" is a video session ID for identifying a video session by the first conference process. A process ID "Process2" is a process ID for identifying a second conference process executed in the terminal apparatus 30. An audio session ID "Audio2" is an audio session ID for identifying an audio session by the second conference process. A video session ID "Video2" is a video session ID for identifying a video session by the second conference process.

The server apparatus 20 receives audio data transmitted from each conference process, by using audio session of each conference process in each communication apparatus of the terminal apparatus 30 and the counterpart apparatuses 81, 82. The server apparatus 20 receives video data transmitted from each conference process, by using video session of each conference process in each communication apparatus of the terminal apparatus 30 and the counterpart apparatuses 81, 82. Transmission of audio data and transmission of video data from the server apparatus 20 will be described later.

The audio data is data that is compressed by particular compression technology such as MPEG-4 AAC and G.411. The video data is video (moving image) data of particular compression technology. The compression technology is H.264, for example. Transmission of video data and audio data from the server apparatus 20 is performed by a streaming method.

In each communication apparatus of the terminal apparatus 30 and the counterpart apparatuses 81, 82, a teleconference screen 60 is displayed for each conference process as video data is transmitted from the server apparatus 20. The teleconference screen 60 includes a video picture area 61 and a shared material area 66 (see FIG. 3). The video picture area 61 is an area for displaying video picture corresponding to video data. In the terminal apparatus 30 and the counterpart apparatuses 81, 82, a display target in the video picture area 61 can be set.

For example, assume that two conference processes are executed in each of the terminal apparatus 30 and the counterpart apparatuses 81, 82. Note that, in a first conference process in the terminal apparatus 30, the display target in the video picture area 61 is set as follows. That is, video picture captured by the camera 42 corresponding to the first conference process in the terminal apparatus 30 is set to hidden (not displayed). Video picture captured by the camera 54 corresponding to a second conference process in the terminal apparatus 30 is set to hidden (not displayed). A video picture 62 by a third conference process in the counterpart apparatus 81 is set to display. A video picture 63 by a fourth conference process in the counterpart apparatus 81 is set to display. A video picture 64 by a fifth conference process in the counterpart apparatus 82 is set to display. A video picture 65 by a sixth conference process in the counterpart apparatus 82 is set to display. In this case, in the first conference process in the terminal apparatus 30, the teleconference screen 60 shown in FIG. 3 is displayed. That is, in the teleconference screen 60, four video pictures 62, 63, 64, and 65 are displayed in the video picture area 61.

Regarding the setting for displaying video picture in the video picture area 61 of the teleconference screen 60, if video picture corresponding to video data of the apparatus itself is set to display, this video picture is displayed by an internal process of the conference process executed by the apparatus itself. For example, assume that, in the terminal apparatus 30, a first conference process targeted at the camera 42 and a second conference process targeted at the camera 54 are executed. Assume that, as the setting for displaying video picture in the video picture area 61 of the teleconference screen 60, both of video picture captured by the camera 42 and video picture captured by the camera 54 are set to display in the first conference process. The video picture captured by the camera 42 is displayed in the video picture area 61 directly by an internal process of the first conference process, without acquisition through the communicator 46. In the first conference process, the video picture captured by the camera 54 is displayed in the video picture area 61 directly by inter-process communication with the second conference process for acquiring video data corresponding to video picture captured by the camera 54, without acquisition through the communicator 46.

The shared material area 66 is an area for displaying shared material 67. The shared material 67 is material that is shared and used in a teleconference by the terminal apparatus 30 and the counterpart apparatuses 81, 82. A teleconference using the shared material 67 is already realized by a known teleconference system. Hence, other descriptions relating this technique are omitted.

<Server Apparatus>

As shown in FIG. 1, the server apparatus 20 includes a CPU 22, a storage device 24, a RAM 26, and a communicator 28. Each of these units 22 to 28 is connected to a bus 29.

The CPU 22 executes arithmetic processes. The storage device 24 is a computer-readable storage medium. For example, the storage device 24 is a hard disk and/or a flash memory. Also, the storage device 24 may include a ROM. Various programs are stored in the storage device 24. For example, an OS (Operating System) and various applications are stored in the storage device 24. The applications stored in the storage device 24 include a teleconference program at the server side. In the embodiment, a teleconference program at the server side is referred to as "server program". The server program includes programs for executing each process shown in FIGS. 10, 11, and 13 described later. The program for executing each process described later is installed preliminarily in the storage device 24.

For example, the preliminary install is performed by reading a program stored in a computer-readable storage medium such as a semiconductor memory by a reader (not shown) of the server apparatus 20. If the server apparatus 20 includes an optical drive (not shown), for example, the preliminary install may be performed by reading the program stored in an optical medium by the optical drive. Also, the preliminary install may be performed by receiving the program stored in a computer-readable storage medium such as a hard disk of a server apparatus different from the server apparatus 20 connected to the network 90, as transmission signals, by the communicator 28 of the server apparatus 20. Which method is adopted is determined appropriately by considering various conditions. Note that the computer-readable storage medium need not include signals that are temporarily transmitted. The computer-readable storage medium may be a non-transitory storage medium that does not include transitory signals. It is sufficient that a non-transitory storage medium store information, irrespective of a time period of storing the information.

The RAM 26 is a memory area that is used when the CPU 22 executes various programs. The RAM 26 stores, in a particular storage area, particular data and information that are used by a process when the process is executed. For example, the RAM 26 stores the participant list (see FIG. 2). In the server apparatus 20, the CPU 22 appropriately executes the OS and the programs of FIGS. 10, 11, and 13 stored in the storage device 24, thereby controlling the server apparatus 20. By this operation, in the server apparatus 20, various processes are executed, and various functions are realized.

The communicator 28 connects the server apparatus 20 to the network 90, and performs data communication through the network 90. In the server apparatus 20, various data are transmitted to and received from each communication apparatus of the terminal apparatus 30 and the counterpart apparatuses 81, 82 through the communicator 28. The communicator 28 is an interface circuit that is adapted to the Ethernet (registered trademark) standard, for example. Connection to the network 90 by the communicator 28 is wired connection. However, connection to the network 90 by the communicator 28 may be wireless connection.

The server apparatus 20 is different from a known server apparatus in that the storage device 24 stores a server program including programs of each process described later (see FIGS. 10, 11, and 13). However, in terms of hardware, the server apparatus 20 may be an information processing apparatus having the same communication functions as a known server apparatus. Thus, although descriptions are omitted above, the server apparatus 20 has configurations included in a known server apparatus, in addition to the above-mentioned each unit 22 to 28.

<Terminal Apparatus>

As shown in FIG. 1, the terminal apparatus 30 includes a CPU 32, a storage device 34, a RAM 36, a display unit 38, an operation unit 40, the camera 42, a speaker 44, the communicator 46, and a connection interface 48. Each of these units 32 to 48 is connected to a bus 50. In the embodiment, the connection interface 48 is referred to as "connection I/F 48". A microphone 52 and the camera 54 are connected to the connection I/F 48.

The CPU 32 executes arithmetic processes. The storage device 34 is a computer-readable storage medium. For example, the storage device 34 is a hard disk and/or a flash memory. Also, the storage device 34 may include a ROM. Various programs are stored in the storage device 34. For example, an OS (Operating System) and various applications are stored in the storage device 34. The applications stored in the storage device 34 include a client program. The client program includes programs for executing each process shown in FIGS. 4-7 and 9 described later. An execution file specified by the start command is also included in the client program. The program for executing each process described later may be installed preliminarily in the storage device 34. Or, when the terminal apparatus 30 accesses the server apparatus 20 for connecting to a teleconference, the program may be transmitted to the terminal apparatus 30 from the server apparatus 20 through the network 90 as transmission signals and be installed in the storage device 34 at that timing. In this case, the program may be stored in the RAM 36.

For example, the preliminary install is performed by reading a program stored in a computer-readable storage medium such as a semiconductor memory by a reader (not shown) of the terminal apparatus 30. If the terminal apparatus 30 includes an optical drive (not shown), for example, the preliminary install may be performed by reading the program stored in an optical medium by the optical drive. Also, the preliminary install may be performed by receiving the program stored in a computer-readable storage medium such as a hard disk of a server apparatus (the server apparatus 20 or a server apparatus not shown in the drawings) connected to the terminal apparatus 30 through the network 90, as transmission signals, by the communicator 46 of the terminal apparatus 30. Which method is adopted is determined appropriately by considering various conditions. Note that the computer-readable storage medium need not include signals that are temporarily transmitted. The computer-readable storage medium may be a non-transitory storage medium that does not include transitory signals. It is sufficient that a non-transitory storage medium store information, irrespective of a time period of storing the information.

The RAM 36 is a memory area that is used when the CPU 32 executes various programs. The RAM 36 stores particular data and information that are used by a process when the process is executed. In the terminal apparatus 30, the CPU 32 appropriately executes the OS and the client program stored in the storage device 34, thereby controlling the terminal apparatus 30. By this operation, in the terminal apparatus 30, for example, various processes including the above-described first and second conference processes are executed, and various functions are realized.

The display unit 38 is a liquid crystal display, for example. The display unit 38 displays various kinds of information. The display unit 38 displays the teleconference screen 60 and a camera selecting screen 70 (see FIG. 8) described later. The operation unit 40 receives inputs such as various instructions to the terminal apparatus 30. The operation unit 40 includes a keyboard and a mouse. Details are omitted, but a process that generates operational information corresponding to each operation to the keyboard and mouse is technology used in known personal computers. The terminal apparatus 30 also adopts this technology.

The camera 42 is an image capturing device that is built in the terminal apparatus 30, for example. The camera 42 captures an external image in a particular direction of the front side of the terminal apparatus 30. The speaker 44 is an example of a sound output device that outputs sound. For example, sound outputted by the speaker 44 is sound corresponding to audio data transmitted from the server apparatus 20 described above. The communicator 46 connects the terminal apparatus 30 to the network 90, and performs data communication through the network 90. In the terminal apparatus 30, various data are transmitted to and received from the server apparatus 20 through the communicator 46. The communicator 46 is an interface circuit that is adapted to the Ethernet (registered trademark) standard, for example. Connection to the network 90 by the communicator 46 may be wireless connection or wired connection.

The connection I/F 48 is an interface for connecting a particular device to the terminal apparatus 30. For example, the connection I/F 48 is an interface having a USB (Universal Serial Bus) port. The microphone 52 connected to the connection I/F 48 is an example of a sound collector that collects external sound. For example, the microphone 52 collects voices outputted by a user who operates the terminal apparatus 30. If there are two users who operate the terminal apparatus 30, the microphone 52 collects voices outputted by the two users. The camera 54 connected to the connection I/F 48 is an image capturing device that is externally connected to the terminal apparatus 30. The camera 54 is set to the terminal apparatus 30 in a state where the camera 54 captures external images from a different direction from the camera 42. For example, assume that there are two users who operate the terminal apparatus 30 and who participate in the same teleconference. The camera 42 captures an external image including one of the two users. The camera 54 captures an external image including the other one of the two users.

The terminal apparatus 30 is different from a known communication apparatus in that the storage device 34 or the RAM 36 stores a client program including programs of each process described later (see FIGS. 4-7 and 9). However, in terms of hardware, the terminal apparatus 30 may be a communication apparatus that is the same as a known communication apparatus.

<Process Executed by Terminal Apparatus>

A client starting process, an audio receiving process, an audio transmitting process, a camera starting process, and an ending process executed by the terminal apparatus 30 in a case where a teleconference is performed by the terminal apparatus 30 and the counterpart apparatuses 81, 82 will be described.

<Client Starting Process>

The client starting process will be described while referring to FIG. 4. When starting the client starting process, in the terminal apparatus 30, an operation targeted at the URL of the server apparatus 20 is received as described above. In the embodiment, the operation targeted at the URL of the server apparatus 20 includes not only a direct operation of the URL of the server apparatus 20 but also an operation of inputting a start command, for example. That is, specifying information in the start command that specifies the server apparatus 20 corresponds to the URL of the server apparatus 20. Based on the above-described start command "ABCJoin.exe/Server=Japan1.ABCJoin.com/Meeting=1234", the "Japan1.ABCJoin.com" is information corresponding to the URL of the server apparatus 20. When an operation targeted at the URL of the server apparatus 20 is received, the CPU 32 starts the client program based on the start command and starts the client starting process. After starting the client program, the CPU 32 stores the start command of this startup in the RAM 36.

The CPU 32 having started the client starting process acquires the start command stored in the RAM 36 (S11). Next, the CPU 32 controls transmission of a second issuance request (S13). The second issuance request is a command for requesting the server apparatus 20 to issue a process ID for identifying a conference process by startup of the client program this time, in a teleconference identified by the conference ID included in the start command acquired in S11. The second issuance request includes the conference ID included in the start command acquired in S11. The transmission destination is set to the server apparatus 20. The CPU 32 outputs a transmission command of the second issuance request to the communicator 46. By this operation, the second issuance request is transmitted from the communicator 46 to the server apparatus 20.

Figure 10:
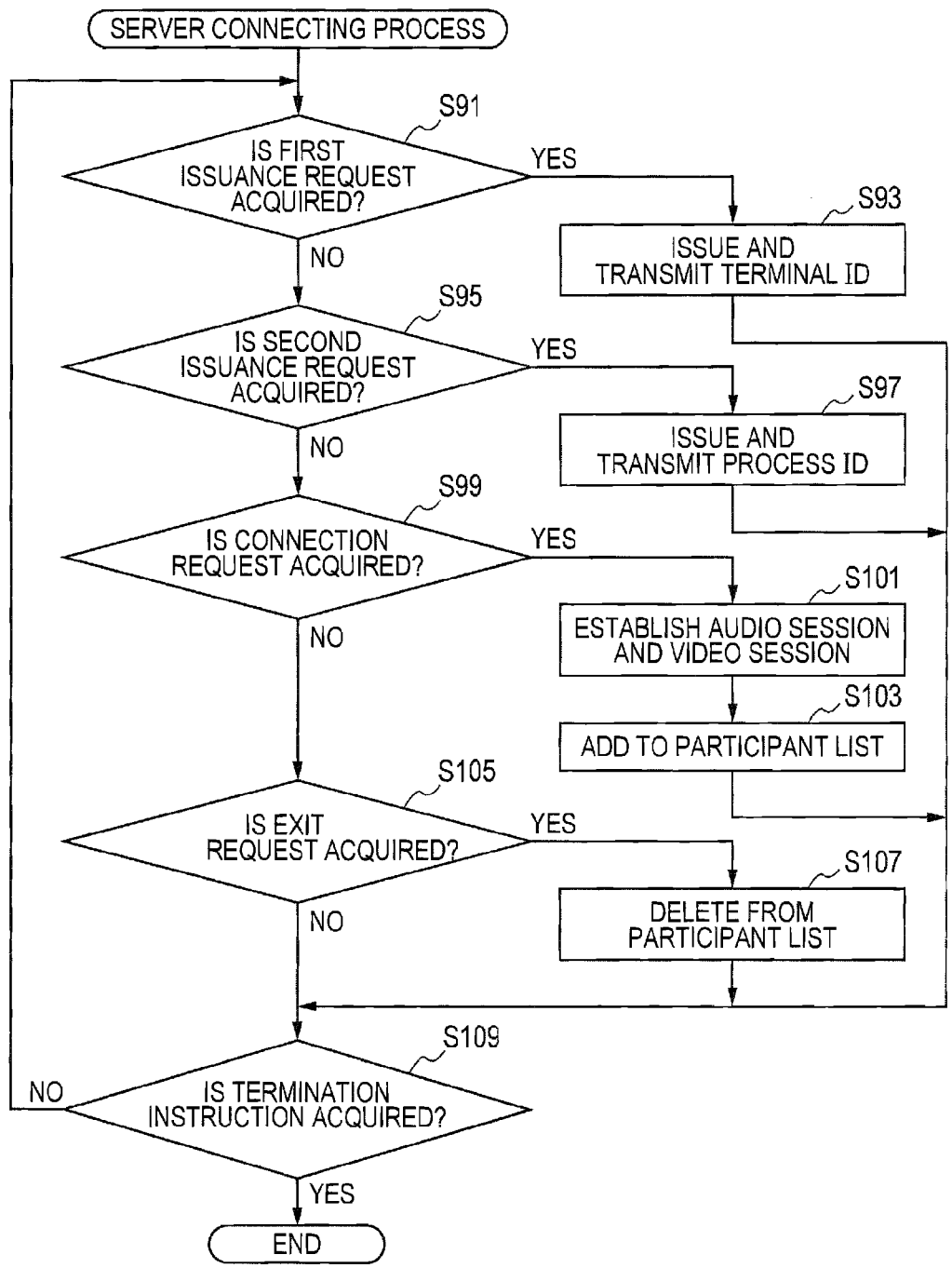
FIG. 10 is a flowchart showing a server connecting process.

In response to the second issuance request, the server apparatus 20 issues a process ID, and transmits the issued process ID to the terminal apparatus 30 of the request source (see S97 of FIG. 10). The CPU 32 acquires this process ID through the communicator 46 (S15). The CPU 32 stores the acquired process ID in a connection file (S17). The connection file is a table-format file that stores a conference ID for identifying teleconference to which the terminal apparatus 30 is currently connected, a terminal ID, and a process ID in association with one another. The connection file is stored in a particular storage area that is secured in either one of the storage device 34 and the RAM 36. That is, the CPU 32 stores, in the connection file, the conference ID included in the start command acquired in S11 and the process ID acquired in S15 in association with each other.

Next, the CPU 32 determines whether a terminal ID is stored in the connection file in association with the conference ID included in the start command acquired in S11 (S19). If the terminal ID is stored in association with the above-mentioned conference ID (S19: Yes), the CPU 32 acquires this terminal ID from the connection file (S21). If the terminal ID is not stored in association with the above-mentioned conference ID (S19: No), the CPU 32 controls transmission of the first issuance request (S23). The first issuance request is a command for requesting the server apparatus 20 to issue a terminal ID for identifying the apparatus (the terminal apparatus 30) itself, in the teleconference identified by the conference ID included in the start command acquired in S11. The first issuance request includes the conference ID included in the start command acquired in S11. The transmission destination is set to the server apparatus 20. The CPU 32 outputs a transmission command of the first issuance request to the communicator 46. By this operation, the first issuance request is transmitted from the communicator 46 to the server apparatus 20.

In response to the first issuance request, the server apparatus 20 issues a terminal ID and transmits the issued terminal ID to the terminal apparatus 30 of the request source (see S93 of FIG. 10). The CPU 32 acquires this terminal ID through the communicator 46 (S25). The CPU 32 stores the acquired terminal ID in the connection file in association with the conference ID included in the start command acquired in S11 and the process ID acquired in S15 (S27).

After executing S21 or S27, the CPU 32 controls transmission of a connection request to the teleconference identified by the conference ID (S29). That is, the CPU 32 outputs a transmission command of the connection request to the communicator 46. The transmission destination is set to the server apparatus 20. By this operation, the connection request is transmitted from the communicator 46 to the server apparatus 20. The connection request includes the conference ID, the terminal ID, and the process ID associated with one another in the connection file. The conference ID is a conference ID included in the start command acquired in S11. After that, the CPU 32 executes particular procedures with the server apparatus 20. By this operation, an audio session and a video session are established between the conference process and the server apparatus 20, which is a state in which the conference process and the server apparatus 20 are connected to each other. The audio session and the video session are established for the conference process by the client program started by the start command acquired in S11.

Next, the CPU 32 starts the audio receiving process and starts the audio transmitting process (S31). The audio receiving process and the audio transmitting process will be described later. Nest, the CPU 32 starts playing video data and starts the camera starting process (S33). The played video data is transmitted from the server apparatus 20 through the video session established in response to the connection request transmitted in S29 of FIG. 4, and is received by the communicator 46. The CPU 32 acquires the video data through the communicator 46. The CPU 32 decodes the acquired video data. The CPU 32 outputs, to the display unit 38, an output command of a video picture corresponding to video data obtained by decoding. This starts display of the video picture in the video picture area 61 of the teleconference screen 60 displayed on the display unit 38. The camera starting process will be described later.

After executing S33, the CPU 32 ends the client starting process. Regarding S31 and S33, the sequence of starting the audio receiving process, the audio transmitting process, playing of video data, and the camera starting process may be different from the above-mentioned sequence. For example, playing of video data, the camera starting process, the audio receiving process, and the audio transmitting process may be started in this sequence. Or, the audio transmitting process, the camera starting process, the audio receiving process, and playing of video data may be started in this sequence.

<Audio Receiving Process>

The audio receiving process started in S31 of FIG. 4 will be described while referring to FIG. 5. The CPU 32 having started the audio receiving process sets connection to the speaker 44 (S41). This setting is managed by the OS. Assume that the conference process is not a conference process by first-time startup, that is, the second conference process that is started in a state where there is an existing conference process, for example. In this case, each of the two conference processes is connected to one speaker 44.

Next, the CPU 32 starts playing of audio data (S43). That is, the CPU 32 starts acquisition, through the communicator 46, of audio data transmitted from the server apparatus 20 through the audio session established in response to the connection request transmitted in S29 of FIG. 4. The CPU 32 decodes the acquired audio data. The CPU 32 outputs, to the speaker 44, an output command of sound corresponding to audio data obtained by decoding. This starts output of sound from the speaker 44. After executing S43, the CPU 32 ends the audio receiving process.

For example, assume that a first conference process and a second conference process are executed in the terminal apparatus 30. The details will be described later, but, for example, the server apparatus 20 does not transmit, to the second conference process, audio data that is already transmitted to the first conference process. Accordingly, even if connection to the speaker 44 is set in the second conference process, the CPU 32 does not acquire audio data in the second conference process. As a result of that, sound is not outputted from the speaker 44 in the second conference process.

<Audio Transmitting Process>

Figure 6:
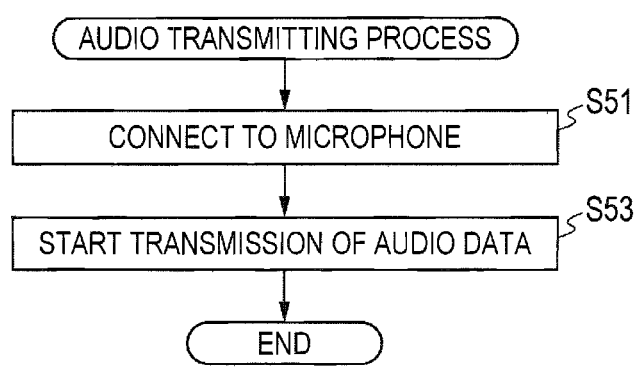
FIG. 6 is a flowchart showing an audio transmitting process.

The audio transmitting process started in S31 of FIG. 4 will be described while referring to FIG. 6. The CPU 32 having started the audio transmitting process sets connection to the microphone 52 (S51). This setting is managed by the OS. Assume that the conference process is not a conference process by first-time startup, that is, the second conference process that is started in a state where there is an existing conference process, for example. In this case, each of the two conference processes is connected to one microphone 52.

Next, the CPU 32 starts transmission of audio data (S53). That is, the CPU 32 encodes sound collected by the microphone 52 and starts generation of audio data. The CPU 32 outputs a transmission command of the generated audio data to the communicator 46. This starts transmission of audio data from the communicator 46 to the server apparatus 20. The audio data is transmitted by using the audio session established in the conference process by the startup this time. After executing S53, the CPU 32 ends the audio transmitting process.

<Camera Starting Process>

The camera starting process started in S33 of FIG. 4 will be described while referring to FIG. 7. The CPU 32 having started the camera starting process generates the camera selecting screen 70 (S71). Next, the CPU 32 controls to display the generated camera selecting screen 70 (S73). That is, the CPU 32 outputs a display command of the camera selecting screen 70 to the display unit 38. By this operation, the camera selecting screen 70 is displayed on the display unit 38.

Figure 8:
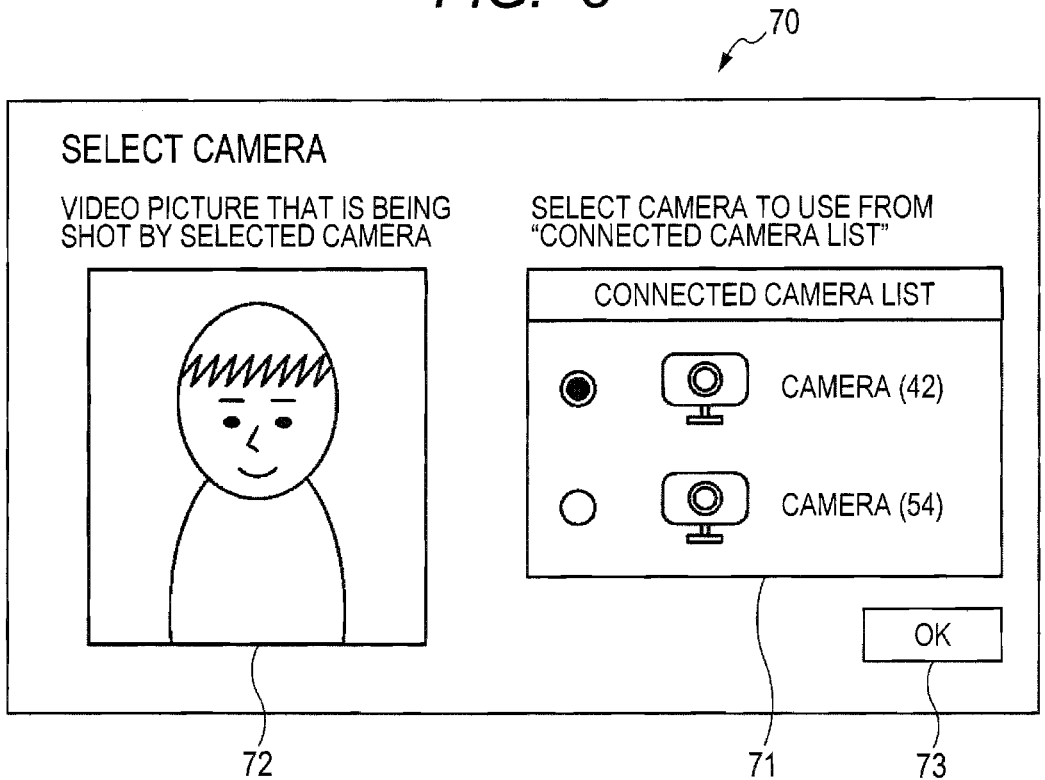
FIG. 8 is a diagram showing an example of a camera selecting screen.

As shown in FIG. 8, the camera selecting screen 70 includes a selection area 71, an image viewing area 72, and an OK button 73. In the selection area 71, a connected camera list is displayed. The connected camera list is a view (list) of cameras provided at the terminal apparatus 30. The cameras provided at the terminal apparatus 30 are managed by the OS. The selection area 71 is an area that receives a selection instruction for selecting one camera from among the connected camera list. For example, the CPU 32 makes an inquiry to the OS about cameras provided at the terminal apparatus 30. Then, the CPU 32 includes a view of cameras acquired from the OS in the connected camera list in the selection area 71. In the embodiment, the cameras 42 and 54 are illustrated as cameras provided at the terminal apparatus 30. Accordingly, in the selection area 71, the connected camera list including the cameras 42 and 54 as options is displayed. The selection instruction is received in response to an operation to the selection area 71 through the operation unit 40.

The image viewing area 72 is an area that displays a video picture that is currently shot by the camera selected by the selection area 71. When a selection instruction is received, the CPU 32 acquires the selection instruction. For example, assume that selection of the camera 42 is received in the selection area 71. In this case, the CPU 32 acquires a selection instruction indicative of the camera 42. The CPU 32 acquires a video picture that is currently shot from the camera 42, and controls to display this video picture in the image viewing area 72. The CPU 32 outputs a display command of the acquired video picture to the display unit 38. By this operation, in the display unit 38, a video picture shot by the camera 42 is displayed in the image viewing area 72 (see FIG. 8). The user of the terminal apparatus 30 can select one camera while viewing this video picture.

The OK button 73 is a button that receives a confirmation instruction for confirming selection of the camera selected in the selection area 71. By receiving the confirmation instruction, selection of one camera is confirmed. The confirmation instruction is received in response to an operation to the OK button 73 through the operation unit 40. When the confirmation instruction is received, the CPU 32 acquires the confirmation instruction.

The CPU 32 confirms the camera selected at the timing of acquisition of the confirmation instruction, as the camera that is used in a conference process by the teleconference program that is started this time. The CPU 32 initializes the selected camera (S75). At that time, the CPU 32 sets connection to the selected camera. This setting is managed by the OS. Next, the CPU 32 starts transmission of video data corresponding to video picture from the initialized camera (S77). That is, the CPU 32 encodes the video picture from the initialized camera, and starts generating video data. The CPU 32 outputs a transmission command of the generated video data to the communicator 46. Then, transmission of video data from the communicator 46 to the server apparatus 20 is started. A video session established in the conference process by the startup this time is used for transmission of video data. After executing S77, the CPU 32 ends the camera starting process.

<Ending Process>

The ending process will be described while referring to FIG. 9. The ending process is started when a termination instruction of a conference process is received. For example, the termination instruction is received in response to an operation of closing the teleconference screen 60 by the conference process through the operation unit 40. In this case, the conference process corresponding to the teleconference screen 60 for which the closing operation is performed is the conference process to be terminated. The CPU 32 having acquired the termination instruction and having started the ending process controls transmission of an exit request (S81). That is, the CPU 32 outputs a transmission command of the exit request to the communicator 46. The transmission destination is set to the server apparatus 20. By this operation, the exit request is transmitted from the communicator 46 to the server apparatus 20. The exit request includes the conference ID, the terminal ID, and the process ID associated with one another in the connection file. By transmitting the exit request, the video session and the audio session between the conference process and the server apparatus 20 are cut off. The exit request may be transmitted by using an established audio session or video session.

After executing S81, the CPU 32 ends the ending process. By this operation, the teleconference by the conference process to be terminated ends. When the ending process is executed for all the conference processes executed in the terminal apparatus 30, the teleconference with the counterpart apparatuses 81, 82 using the terminal apparatus 30 ends.

Figure 4:
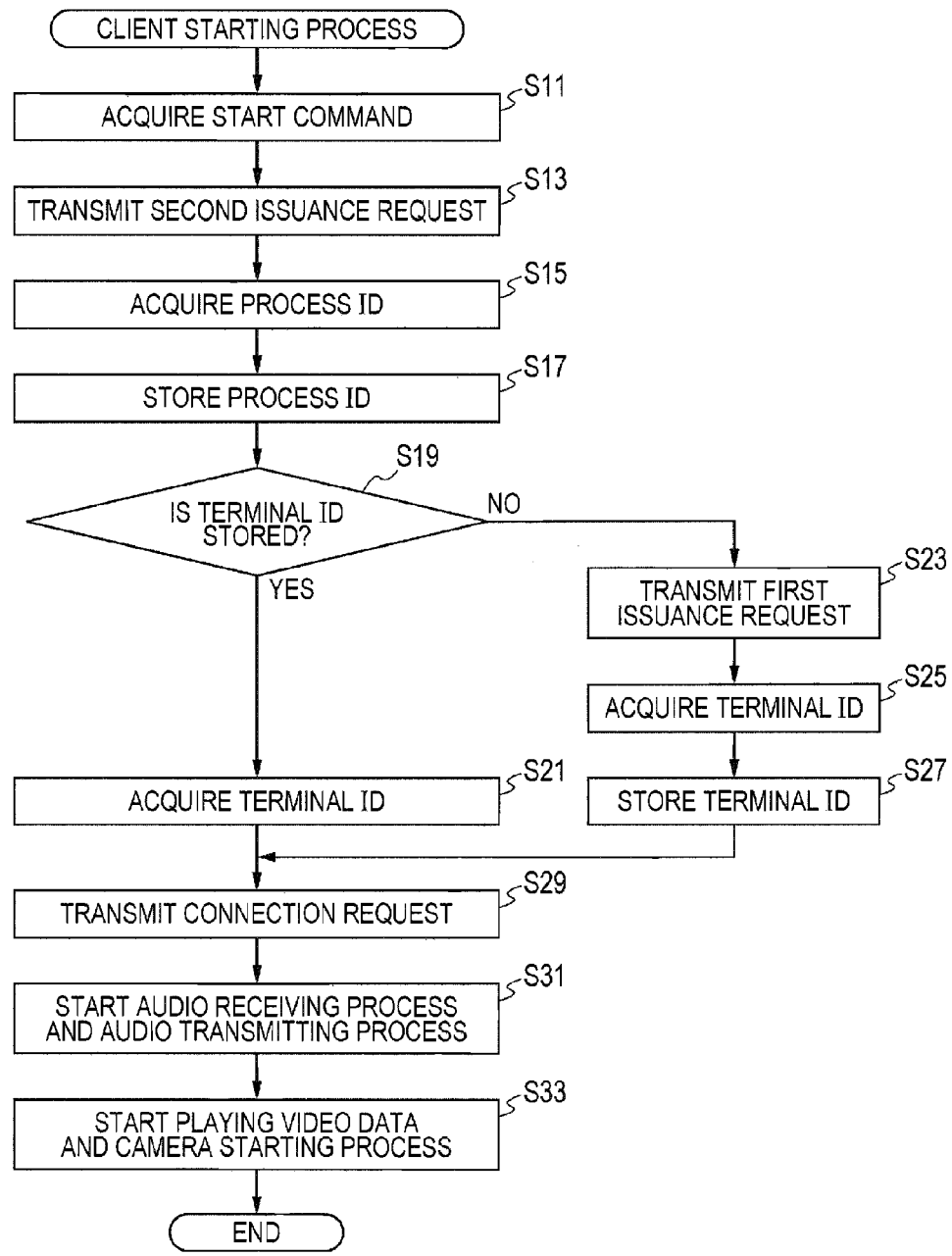
FIG. 4 is a flowchart showing a client starting process.
Figure 5:
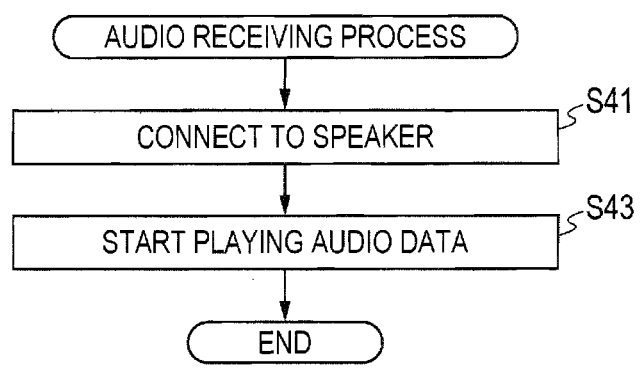
FIG. 5 is a flowchart showing an audio receiving process.

In response to ending of the ending process targeted at a particular conference process, the CPU 32 ends the audio receiving process started in S31 of FIG. 4 (see FIG. 5) in this conference process. The CPU 32 releases the speaker 44 set to connection in S41 of FIG. 5. That is, the CPU 32 notifies the OS managing connection to the speaker 44 about releasing connection to the speaker 44. If there is no more conference process that is executed in the terminal apparatus 30, the speaker 44 is completely released from the conference process by the client program.

In response to ending of the ending process targeted at the particular conference process, the CPU 32 ends the audio transmitting process started in S31 of FIG. 4 (see FIG. 6) in this conference process. The CPU 32 releases the microphone 52 set to connection in S51 of FIG. 6. That is, the CPU 32 notifies the OS managing connection to the microphone 52 about releasing connection to the microphone 52. If there is no more conference process that is executed in the terminal apparatus 30, the microphone 52 is completely released from the conference process by the client program.

In response to ending of the ending process targeted at the particular conference process, the CPU 32 ends playing of video data started in S33 of FIG. 4 in this conference process. In response to ending of the ending process targeted at the particular conference process, the CPU 32 ends transmission of video data started in S77 of FIG. 7 in this conference process. The CPU 32 releases the camera set to connection in S75 of FIG. 7. That is, the CPU 32 notifies the OS managing connection to the camera about releasing connection to the camera. For example, assume that the camera 54 is set to connection in S75 of FIG. 7. In this case, the CPU 32 notifies the OS about releasing connection to the camera 54.

<Processes Executed by Server Apparatus>

The server connecting process, the audio transferring process, and the video transferring process executed by the server apparatus 20, in a case where a teleconference by the terminal apparatus 30 and the counterpart apparatuses 81, 82 is conducted, will be described.

<Server Connecting Process>

The server connecting process will be described while referring to FIG. 10. The server connecting process is started, for example, when a starting instruction of the server connecting process is received by an operation unit (not shown) of the server apparatus 20 and the CPU 22 acquires this starting instruction. The CPU 22 having started the server connecting process determines whether the first issuance request is acquired through the communicator 28 (S91). The first issuance request is transmitted in S23 of FIG. 4. The CPU 22 performs an authentication process of the acquired first issuance request by the conference ID included in the first issuance request. If the first issuance request is acquired (S91: Yes), the CPU 22 issues a terminal ID and controls transmission of the issued terminal ID (S93). A case in which the first issuance request is acquired does not include a case in which an invalid first issuance request is acquired. The invalid first issuance request does not include a conference ID for identifying the teleconference by the terminal apparatus 30 and the counterpart apparatuses 81, 82. For example, assume that the first issuance request is transmitted in the first conference process executed by the terminal apparatus 30. In this case, the CPU 22 issues "PC A" as a terminal ID for identifying the terminal apparatus 30 in the teleconference identified by the conference ID. The CPU 22 outputs a transmission command of the terminal ID "PC A" to the communicator 28. The transmission destination is set to the terminal apparatus 30 that is the transmission-source apparatus of the first issuance request. By this operation, the terminal ID "PC A" is transmitted from the communicator 28 to the terminal apparatus 30. After that, the CPU 22 moves the process to S109.

If the first issuance request is not acquired (S91: No), the CPU 22 determines whether the second issuance request is acquired through the communicator 28 (S95). A case in which the first issuance request is not acquired includes a case in which an invalid first issuance request is acquired. The second issuance request is transmitted in S13 of FIG. 4. The CPU 22 performs an authentication process of the acquired second issuance request by the conference ID included in the second issuance request. If the second issuance request is acquired (S95: Yes), the CPU 22 issues a process ID and controls transmission of the issued process ID (S97). A case in which the second issuance request is acquired does not include a case in which an invalid second issuance request is acquired. The invalid second issuance request does not include a conference ID for identifying the teleconference by the terminal apparatus 30 and the counterpart apparatuses 81, 82. For example, assume that the second issuance request is transmitted in the second conference process executed by the terminal apparatus 30. In this case, the CPU 22 issues "Process2" as a process ID for identifying the second conference process in the teleconference identified by the conference ID. The CPU 22 outputs a transmission command of the process ID "Process2" to the communicator 28. The transmission destination is set to the terminal apparatus 30 that is the transmission-source apparatus of the second issuance request. By this operation, the process ID "Process2" is transmitted from the communicator 28 to the terminal apparatus 30. After that, the CPU 22 moves the process to S109.

If the second issuance request is not acquired (S95: No), the CPU 22 determines whether a connection request is acquired through the communicator 28 (S99). A case in which the second issuance request is not acquired includes a case in which an invalid second issuance request is acquired. The connection request is transmitted in S29 of FIG. 4. The CPU 22 performs an authentication process of the acquired connection request by the conference ID included in the connection request. If the connection request is acquired (S99: Yes), the CPU 22 establishes an audio session and a video session with the conference process executed by the transmission-source apparatus of the connection request (S101). A case in which the connection request is acquired does not include a case in which an invalid connection request is acquired. The invalid connection request does not include a conference ID for identifying the teleconference by the terminal apparatus 30 and the counterpart apparatuses 81, 82. In S101, the CPU 22 executes particular procedures with this conference process. By this operation, an audio session and a video session are established between this conference process and the server apparatus 20, so that the conference process and the server apparatus 20 become a connected state.

Next, the CPU 22 stores, in the participant list, the conference ID, the terminal ID, the process ID, the audio session ID, and the video session ID in association with one another (S103). The conference ID, the terminal ID, and the process ID out of the above-mentioned IDs are included in the acquired connection request. The audio session ID is information for identifying the audio session newly established in response to this connection request. When the CPU 22 stores the ID, the CPU 22 issues a new audio session ID. The video session ID is information for identifying the video session newly established in response to this connection request. When the CPU 22 stores the ID, the CPU 22 issues a new video session ID.

For example, a connection request is acquired from the second conference process executed by the terminal apparatus 30. In this case, the connection request includes a conference ID "1234", a terminal ID "PC A", and a process ID "Process2". Assume that the storage state of the participant list is the upper table in FIG. 2. The CPU 22 acquires the conference ID "1234", the terminal ID "PC A", and the process ID "Process2" from the connection request. The CPU 22 issues an audio session ID "Audio2" to the newly established audio session. The CPU 22 issues a video session ID "Video2" to the newly established video session. The CPU 22 stores, in the participant list, the conference ID "1234", the terminal ID "PC A", the process ID "Process2", the audio session ID "Audio2", and the video session ID "Video2" in association with one another. By this process, the participant list stores the conference ID "1234", the terminal ID "PC A", the process ID "Process2", the audio session ID "Audio2", and the video session ID "Video2" in association with one another (see the middle table in FIG. 2). After that, the CPU 22 moves the process to S109.

If the connection request is not acquired (S99: No), the CPU 22 determines whether an exit request is acquired through the communicator 28 (S105). The exit request is transmitted in S81 of FIG. 9. A case in which the connection request is not acquired includes a case in which an invalid connection request is acquired. If the exit request is acquired (S105: Yes), the CPU 22 deletes, from the participant list, the conference ID, the terminal ID, and the process ID matching the conference ID, the terminal ID, and the process ID included in the exit request, and also deletes the audio session ID and the video session ID associated with these IDs (S107).

For example, assume that an exit request is acquired from the first conference process executed by the terminal apparatus 30. In this case, the exit request includes a conference ID "1234", a terminal ID "PC A", and a process ID "Process1". Assume that the storage state of the participant list is the middle table in FIG. 2. The CPU 22 acquires the conference ID "1234", the terminal ID "PC A", and the process ID "Process1" from the exit request. The CPU 22 identifies, from the participant list, a record associated with the conference ID "1234", the terminal ID "PC A", and the process ID "Process1". That is, the CPU 22 identifies the record that is the second row from the bottom in the participant list shown in the middle table of FIG. 2. The CPU 22 deletes, from the participant list, the conference ID "1234", the terminal ID "PC A", the process ID "Process1", the audio session ID "Audio1", and the video session ID "Video1" associated with one another in the identified record. By this process, the conference ID "1234", the terminal ID "PC A", the process ID "Process1", the audio session ID "Audio1", and the video session ID "Video1" are deleted from the participant list (see the lower table of FIG. 2). After that, the CPU 22 moves the process to S109.

In S109, the CPU 22 determines whether a termination instruction of the server connecting process is acquired. The termination instruction is received by the operation unit (not shown) of the server apparatus 20, in a similar manner to the starting instruction of the server connecting process. If the termination instruction is not acquired (S109: No), the CPU 22 returns the process to S91. After that, the CPU 22 repeatedly executes the processes in S91 and thereafter. If the termination instruction is acquired (S109: Yes), the CPU 22 ends the server connecting process.

<Audio Transferring Process>

The audio transferring process will be described while referring to FIG. 11. The audio transferring process is started, for example, at the timing when the server connecting process is started. The CPU 22 having started the audio transferring process determines whether audio data is acquired through the communicator 28 (S111). The audio data is transmitted to the server apparatus 20 through an audio session established between the terminal apparatus 30 and the conference process executed by one communication apparatus of the counterpart apparatuses 81, 82, in a teleconference by the terminal apparatus 30 and the counterpart apparatuses 81, 82. If the audio data is not acquired (S111: No), the CPU 22 moves the process to S127. If the audio data is acquired (S111: Yes), the CPU 22 selects one of the process IDs stored in the participant list as the process ID to be processed (S113). The process ID selected as the process ID to be processed is one of the process IDs that have not been the target of processes in S115 to S121.

Next, the CPU 22 determines whether the terminal ID associated with the process ID to be processed in the participant list matches the terminal ID for identifying the transmission-source apparatus of the acquired audio data (S115). The CPU 22 accesses the participant list and acquires the terminal ID associated with the process ID to be processed. In the embodiment, the terminal ID associated with the process ID to be processed in the participant list is referred to as "terminal ID to be processed". The CPU 22 identifies the audio session for which the audio data has been acquired. The CPU 22 accesses the participant list, and acquires the terminal ID associated with the audio session ID for identifying the identified audio session. In S115, the CPU 22 compares the terminal ID to be processed with the terminal ID based on the above-mentioned audio session, and determines whether the both terminal IDs are identical.

If the both terminal IDs are identical (S115: Yes), the CPU 22 moves the process to S123. If the both terminal IDs are not identical (S115: No), the CPU 22 determines whether the terminal ID matching the terminal ID to be processed is stored in an audio transfer list (S117). The audio transfer list is stored in the RAM 26. The audio transfer list will be described later. If the terminal ID matching the terminal ID to be processed is stored in the audio transfer list (S117: Yes), the CPU 22 moves the process to S123.

Figure 12:
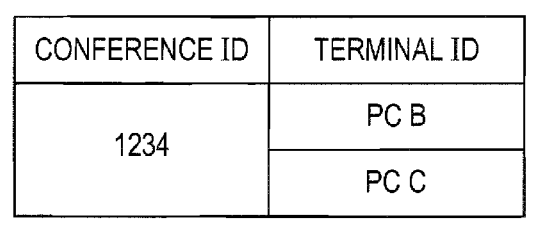

If the terminal ID matching the terminal ID to be processed is not stored in the audio transfer list (S117: No), the CPU 22 controls transmission of the acquired audio data (S119). The audio data is transmitted through the audio session identified by the audio session ID associated with the process ID to be processed in the participant list. Subsequently, the CPU 22 stores the terminal ID to be processed in the audio transfer list (S121). The audio transfer list is a list storing the terminal ID for identifying the communication apparatus to which the audio data acquired this time by the server apparatus 20 has been transmitted in S119, in the teleconference identified by the conference ID (see FIG. 12).

After executing S121, the CPU 22 determines whether all the process IDs stored in the participant list are selected as the process target of S115 to S121 (S123). Assume that the participant list is in the storage state shown in the middle table of FIG. 2. For example, if "Process3", "Process4", "Process5", and "Process6" are the process IDs that are already selected as the process target in S113, "Process1" and "Process2" are unselected process IDs. In this case, the CPU 22 negates determination in S123 (S123: No), and returns the process to S113. After that, the CPU 22 executes the processes in S113 and thereafter. On the other hand, if "Process3", "Process4", "Process5", "Process6", "Process1", and "Process2" are the process IDs that are already selected as the process target in S113, there is no unselected process ID. In this case, the CPU 22 affirms determination in S123 (S123: Yes), and moves the process to S125.

In S125, the CPU 22 deletes all the terminal IDs stored in the audio transfer list. For example, assume that audio data has been acquired from the first conference process (process ID: Process1) of the terminal apparatus 30 (terminal ID: PC A). In this case, the audio transfer list stores the terminal IDs "PC B" and "PC C" (see FIG. 12). In S125, the CPU 22 deletes the terminal IDs "PC B" and "PC C" stored in the audio transfer list. By this process, the audio transfer list becomes a state in which no terminal ID is stored. Subsequently, the CPU 22 determines whether the server connecting process is being executed (S127). The CPU 22 inquires the OS about whether the server connecting process is being executed. In accordance with a response from the OS for this inquiry, the CPU 22 determines whether the server connecting process is being executed. If the server connecting process is being executed (S127: Yes), the CPU 22 returns the process to S111. After that, the CPU 22 repeatedly executes the processes in S111 and thereafter. If the server connecting process is not being executed (S127: No), the CPU 22 ends the audio transferring process. As described above, the server connecting process ends in response to acquisition of the termination instruction (see S109: Yes in FIG. 10). That is, the CPU 22 ends the audio transferring process in response to acquisition of the termination instruction.

<Video Transferring Process>

The video transferring process will be described while referring to FIG. 13. The video transferring process is started, for example, at the timing when the server connecting process is started. The CPU 22 having started the video transferring process determines whether video data is acquired through the communicator 28 (S131). The video data is transmitted to the server apparatus 20 through a video session established between the terminal apparatus 30 and the conference process executed by one communication apparatus of the counterpart apparatuses 81, 82, in a teleconference by the terminal apparatus 30 and the counterpart apparatuses 81, 82. If the video data is not acquired (S131: No), the CPU 22 moves the process to S147. If the video data is acquired (S131: Yes), the CPU 22 selects one of the process IDs stored in the participant list as the process ID to be processed (S133). The process ID selected as the process ID to be processed is one of the process IDs that have not been the target of processes in S135 to S141.

Next, the CPU 22 determines whether the terminal ID associated with the process ID to be processed in the participant list matches the terminal ID for identifying the transmission-source apparatus of the acquired video data (S135). The CPU 22 accesses the participant list and acquires the terminal ID associated with the process ID to be processed. In the embodiment, the terminal ID associated with the process ID to be processed in the participant list is referred to as "terminal ID to be processed". The CPU 22 identifies the video session for which the video data has been acquired. The CPU 22 accesses the participant list, and acquires the terminal ID associated with the video session ID for identifying the identified video session. In S135, the CPU 22 compares the terminal ID to be processed with the terminal ID based on the above-mentioned video session, and determines whether the both terminal IDs are identical.

If the both terminal IDs are identical (S135: Yes), the CPU 22 moves the process to S143. If the both terminal IDs are not identical (S135: No), the CPU 22 determines whether the terminal ID matching the terminal ID to be processed is stored in a video transfer list (S137). The video transfer list is stored in the RAM 26. The video transfer list will be described later. If the terminal ID matching the terminal ID to be processed is stored in the video transfer list (S137: Yes), the CPU 22 moves the process to S143.

If the terminal ID matching the terminal ID to be processed is not stored in the video transfer list (S137: No), the CPU 22 controls transmission of the acquired video data (S139). The video data is transmitted through the video session identified by the video session ID associated with the process ID to be processed in the participant list. Subsequently, the CPU 22 stores the terminal ID to be processed in the video transfer list (S141). The video transfer list is a list storing the terminal ID for identifying the communication apparatus to which the video data acquired this time by the server apparatus 20 has been transmitted in S139, in the teleconference identified by the conference ID. The video transfer list has the same format as the audio transfer list shown in FIG. 12.

After executing S141, the CPU 22 determines whether all the process IDs stored in the participant list are selected as the process target of S135 to S141 (S143). Assume that the participant list is in the storage state shown in the middle table of FIG. 2. For example, if "Process3", "Process4", "Process5", and "Process6" are the process IDs that are already selected as the process target in S133, "Process1" and "Process2" are unselected process IDs. In this case, the CPU 22 negates determination in S143 (S143: No), and returns the process to S133. After that, the CPU 22 executes the processes in S133 and thereafter. On the other hand, if "Process3", "Process4", "Process5", "Process6", "Process1", and "Process2" are the process IDs that are already selected as the process target in S133, there is no unselected process ID. In this case, the CPU 22 affirms determination in S143 (S143: Yes), and moves the process to S145.

In S145, the CPU 22 deletes all the terminal IDs stored in the video transfer list. For example, assume that video data has been acquired from the first conference process (process ID: Process1) of the terminal apparatus 30 (terminal ID: PC A). In this case, the video transfer list stores the terminal IDs "PC B" and "PC C". In S145, the CPU 22 deletes the terminal IDs "PC B" and "PC C" stored in the video transfer list. By this process, the video transfer list becomes a state in which no terminal ID is stored. Subsequently, the CPU 22 determines whether the server connecting process is being executed (S147). The CPU 22 inquires the OS about whether the server connecting process is being executed. In accordance with a response from the OS for this inquiry, the CPU 22 determines whether the server connecting process is being executed. If the server connecting process is being executed (S147: Yes), the CPU 22 returns the process to S131. After that, the CPU 22 repeatedly executes the processes in S131 and thereafter. If the server connecting process is not being executed (S147: No), the CPU 22 ends the video transferring process. As described above, the server connecting process ends in response to acquisition of the termination instruction (see S109: Yes in FIG. 10). That is, the CPU 22 ends the video transferring process together with the audio transferring process, in response to acquisition of the termination instruction.

Effects of Embodiment

According to the above-described embodiment, the following effects can be obtained.

(1) In the teleconference system 10, a plurality of client programs can be started in the terminal apparatus 30 that is used in a teleconference identified by a conference ID. Accordingly, in the terminal apparatus 30, a plurality of conference processes is executed concurrently. Each conference process is connected to the server apparatus 20 through the audio session and the video session established with the server apparatus 20. In the terminal apparatus 30, in response to startup of the client program, the client starting process shown in FIG. 4 is executed. In the counterpart apparatuses 81, 82, too, a plurality of client programs can be started. In the counterpart apparatuses 81, 82, too, in response to startup of the client program, the client starting process shown in FIG. 4 is executed. In the server apparatus 20, the server connecting process shown in FIG. 10 is executed.

In the client starting process, the second issuance request is transmitted to the server apparatus 20 (see S13 in FIG. 4). In the server connecting process, when the second issuance request is acquired (see S95: Yes in FIG. 10), a process ID is issued in response to the second issuance request, and the issued process ID is transmitted to the transmission-source apparatus of the second issuance request (see S97 in FIG. 10). If the transmission-source apparatus of the second issuance request is the terminal apparatus 30, the issued process ID is transmitted to the terminal apparatus 30. The terminal apparatus 30 acquires the process ID for identifying the conference process started this time (see S15 in FIG. 4). The acquired process ID is stored in the connection file (see S17 in FIG. 4).

In the client starting process, it is determined whether the terminal ID is stored in the connection file (see S19 in FIG. 4). If the terminal ID is stored in the connection file (see S19: Yes in FIG. 4), the terminal ID is acquired from the connection file (see S21 in FIG. 4). If the terminal ID is not stored in the connection file (see S19: No in FIG. 4), the first issuance request is transmitted to the server apparatus 20 (see S23 in FIG. 4). In the server connecting process, if the first issuance request is acquired (see S91: Yes in FIG. 10), a terminal ID is issued in response to the first issuance request, and the issued terminal ID is transmitted to the transmission-source apparatus of the first issuance request (see S93 in FIG. 10). If the transmission-source apparatus of the first issuance request is the terminal apparatus 30, the issued terminal ID is transmitted to the terminal apparatus 30. The terminal apparatus 30 acquires the terminal ID for identifying the apparatus itself in the teleconference identified by the conference ID (see S25 in FIG. 4). The acquired terminal ID is stored in the connection file (see S27 in FIG. 4).

In the client starting process, the connection request including the conference ID, the terminal ID, and the process ID stored in the connection file in association with one another is transmitted to the server apparatus 20 (see S29 in FIG. 4). In the server connecting process, if the connection request is acquired (see S99: Yes in FIG. 10), an audio session and a video session are established with the conference process executed by the transmission-source apparatus of the connection request (see S101 in FIG. 10). If the transmission-source apparatus of the connection request is the terminal apparatus 30, the audio session and the video session are established with the first conference process or the second conference process executed by the terminal apparatus 30. The conference ID, the terminal ID, the process ID, the audio session ID, and the video session ID are stored in the participant list in association with one another (see FIG. 2 and S103 in FIG. 10). The conference ID, the terminal ID, and the process ID are included in the connection request. The audio session ID is issued in response to establishment of the audio session. The video session ID is issued in response to establishment of the video session. In the client starting process, in response to establishment of the audio session, the audio receiving process (see FIG. 5) is started and the audio transmitting process (see FIG. 6) is started (see S31 in FIG. 4). The audio data is transmitted and received though the established audio session. In client starting process, in response to establishment of the video session, playing of video data from the server apparatus 20 is started, and the camera starting process (see FIG. 7) is started (see S33 in FIG. 4). In the camera starting process, transmission of video data corresponding to video picture captured by the selected camera is started (see S77 in FIG. 7). The video data is transmitted and received though the established video session.

Hence, in the teleconference system 10, transmission and reception of audio data between the terminal apparatus 30 and the counterpart apparatuses 81, 82 through the server apparatus 20 can be performed in a state where the conference process executed by each communication apparatus is distinguished by the terminal ID, the process ID, and the audio session ID. At this time, transmission and reception of audio data can be performed through the audio session established between each conference process and the server apparatus 20. In the teleconference system 10, transmission and reception of video data between the terminal apparatus 30 and the counterpart apparatuses 81, 82 through the server apparatus 20 can be performed in a state where the conference process executed by each communication apparatus is distinguished by the terminal ID, the process ID, and the video session ID. At this time, transmission and reception of video data can be performed through the video session established between each conference process and the server apparatus 20.

In the server apparatus 20, a terminal ID is issued in response to the first issuance request from the terminal apparatus 30, and the issued terminal ID is notified to the terminal apparatus 30. The terminal apparatus 30 acquires the terminal ID for identifying the apparatus itself by the first issuance request. If a conference process is already executed, the terminal apparatus 30 acquires a terminal ID from the connection file without using the first issuance request. The server apparatus 20 issues a process ID in response to the second issuance request from the terminal apparatus 30, and notifies the issued process ID to the terminal apparatus 30. The terminal apparatus 30 acquires the process ID for identifying the conference process that has been newly started by the second issuance request.

Figure 11:
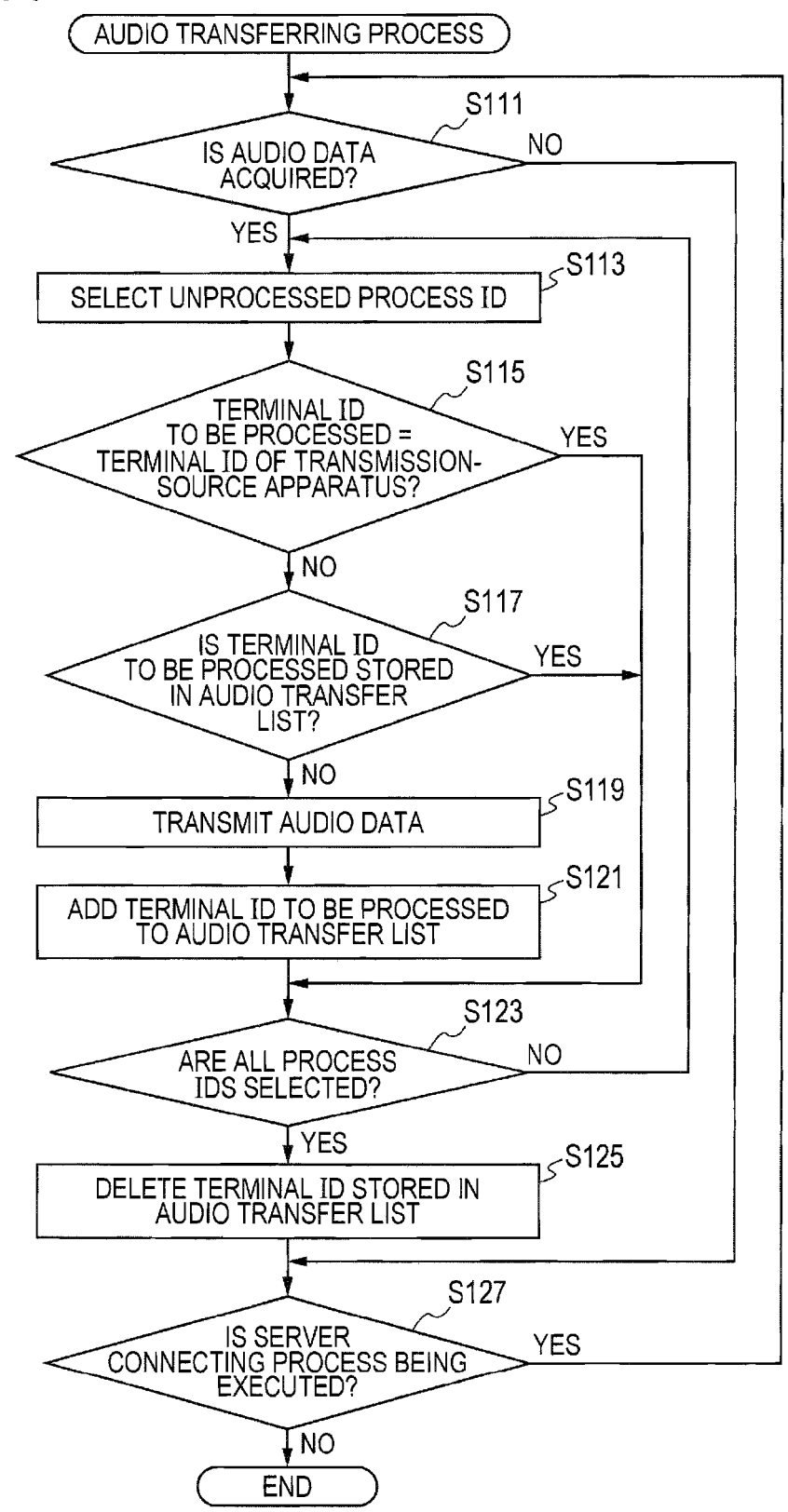
FIG. 11 is a flowchart showing an audio transferring process.

(2) In the audio transferring process shown in FIG. 11, when audio data is acquired (see S111: Yes in FIG. 11), the transfer-destination apparatus of audio data is determined as follows, based on the storage state of the participant list and the audio transfer list. That is, in response to acquisition of audio data, the terminal ID associated with the process ID to be processed (terminal ID to be processed) is acquired from the participant list. The terminal ID, which is associated with the audio session ID for identifying the audio session through which audio data is acquired, is acquired from the participant list. It is determined whether the both terminal IDs are identical (see S115 in FIG. 11). If the both terminal IDs are not identical (see S115: No in FIG. 11), it is determined whether the terminal ID matching the terminal ID to be processed is stored in the audio transfer list (see S117 in FIG. 11). If the terminal ID matching the terminal ID to be processed is not stored in the audio transfer list (see S117: No in FIG. 11), the acquired audio data is transmitted through the audio session identified by the audio session ID associated with the process ID to be processed in the participant list (see S119 in FIG. 11). If the audio data is transmitted, the terminal ID to be processed is stored in the audio transfer list (see S121 in FIG. 11). If determination in S115 or S117 is affirmed (see S115, S117: Yes in FIG. 11), step S119 is not executed.

Hence, even if a plurality of conference processes is executed in part or all of the communication apparatuses of the terminal apparatus 30 and the counterpart apparatuses 81, 82, out of the terminal apparatus 30 and the counterpart apparatuses 81, 82, the communication apparatus, which is identified, in the participant list, by the terminal ID associated with the audio session ID for identifying the audio session through which audio data is acquired, is excluded from the transfer-destination apparatus. Transferring of audio data to the transmission-source apparatus of the audio data can be prevented. Even if a plurality of conference processes is executed in part or all of the communication apparatuses of the terminal apparatus 30 and the counterpart apparatuses 81, 82, out of the terminal apparatus 30 and the counterpart apparatuses 81, 82, the communication apparatus identified by the terminal ID stored in the audio transfer list is excluded from the transfer-destination apparatus. Transferring the same audio data to the communication apparatus to which the audio data has been transmitted can be prevented. In a case where a plurality of client programs is started and a plurality of conference processes is executed in each communication apparatus of the terminal apparatus 30 and the counterpart apparatuses 81, 82, whether to output sound at each communication apparatus can be controlled by performing or not performing transmission of audio data in the server apparatus 20.

Figure 13:
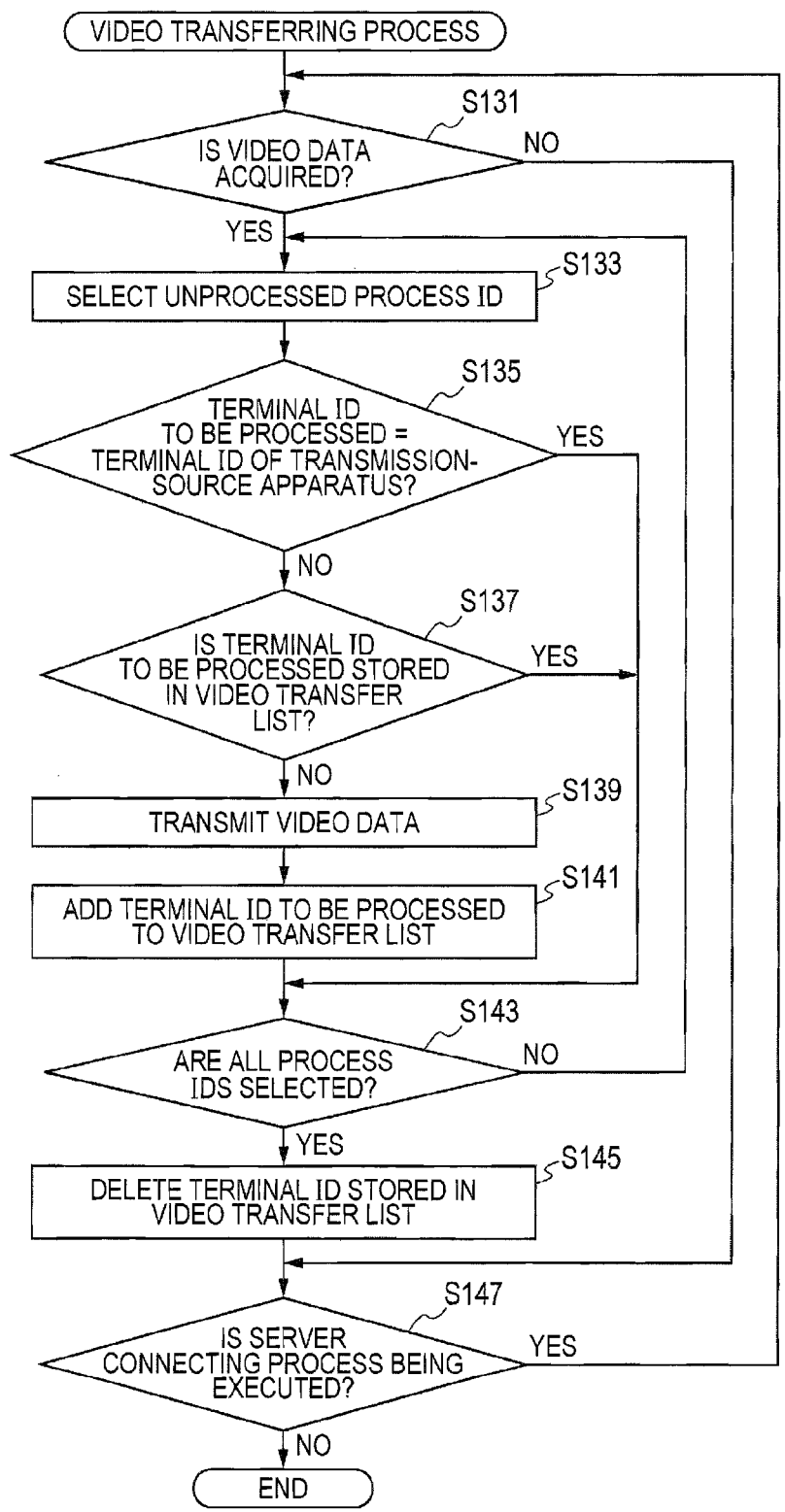
FIG. 13 is a flowchart showing a video transferring process.

(3) In the video transferring process shown in FIG. 13, when video data is acquired (see S131: Yes in FIG. 13), the transfer-destination apparatus of video data is determined as follows, based on the storage state of the participant list and the video transfer list. That is, in response to acquisition of video data, the terminal ID associated with the process ID to be processed (terminal ID to be processed) is acquired from the participant list. The terminal ID, which is associated with the video session ID for identifying the video session through which video data is acquired, is acquired from the participant list. It is determined whether the both terminal IDs are identical (see S135 in FIG. 13). If the both terminal IDs are not identical (see S135: No in FIG. 13), it is determined whether the terminal ID matching the terminal ID to be processed is stored in the video transfer list (see S137 in FIG. 13). If the terminal ID matching the terminal ID to be processed is not stored in the video transfer list (see S137: No in FIG. 13), the acquired video data is transmitted through the video session identified by the video session ID associated with the process ID to be processed in the participant list (see S139 in FIG. 13). If the video data is transmitted, the terminal ID to be processed is stored in the video transfer list (see S141 in FIG. 13). If determination in S135 or S137 is affirmed (see S135, S137: Yes in FIG. 13), step S139 is not executed.

Hence, even if a plurality of conference processes is executed in part or all of the communication apparatuses of the terminal apparatus 30 and the counterpart apparatuses 81, 82, out of the terminal apparatus 30 and the counterpart apparatuses 81, 82, the communication apparatus, which is identified, in the participant list, by the terminal ID associated with the video session ID for identifying the video session through which video data is acquired, is excluded from the transfer-destination apparatus. Transferring of video data to the transmission-source apparatus of the video data can be prevented. Even if a plurality of conference processes is executed in part or all of the communication apparatuses of the terminal apparatus 30 and the counterpart apparatuses 81, 82, out of the terminal apparatus 30 and the counterpart apparatuses 81, 82, the communication apparatus identified by the terminal ID stored in the video transfer list is excluded from the transfer-destination apparatus. Transferring the same video data to the communication apparatus to which the video data has been transmitted can be prevented. In a case where a plurality of client programs is started and a plurality of conference processes is executed in each communication apparatus of the terminal apparatus 30 and the counterpart apparatuses 81, 82, whether to output video picture at each communication apparatus can be controlled by performing or not performing transmission of video data in the server apparatus 20.

<Modifications>

While the disclosure has been described in detail with reference to the above aspects thereof, it would be apparent to those skilled in the art that various changes and modifications may be made therein without departing from the scope of the claims. In the following description, like parts and components are designated by the same reference numerals to avoid duplicating description.

(1) In the above-described embodiment, an audio session and a video session are established between one conference process and the server apparatus 20. The session established between the one conference process and the server apparatus 20 may be a single session. In this case, the audio data and the video data are transmitted and received through this single session. In a teleconference identified by the conference ID, this session is identified by a session ID.

(2) In the above-described embodiment, "ABCJoin.exe/Server=Japan1.ABCJoin.com/Meeting=1234" is illustrated as a start command, and a conference ID is included in the start command. A start command that does not include a conference ID may be used. In this case, for example, the client program includes a module that displays an authentication screen for user authentication in response to input of the start command. With this configuration, in the terminal apparatus 30, when the client program is started, an authentication screen (not shown) is displayed on the display unit 38. The user of the terminal apparatus 30 operates the operation unit 40 and inputs an ID for authentication in the authentication screen. The CPU 32 acquires the inputted ID for authentication as the conference ID described above.

In S91 in the server connecting process shown in FIG. 10, as described above, the authentication process is executed by the conference ID corresponding to an ID for authentication included in the acquired first issuance request. If the ID for authentication inputted as the conference ID is invalid, determination in S91 is negated (see S91: No in FIG. 10). In S95, as described above, the authentication process is executed by the conference ID corresponding to the ID for authentication included in the acquired second issuance request. If the ID for authentication inputted as the conference ID is invalid, determination in S95 is negated (see S95: No in FIG. 10). In S99, as described above, the authentication process is executed by the conference ID corresponding to an ID for authentication included in the acquired connection request. If the ID for authentication inputted as the conference ID is invalid, determination in S99 is negated (see S99: No in FIG. 10).

Figure 7:
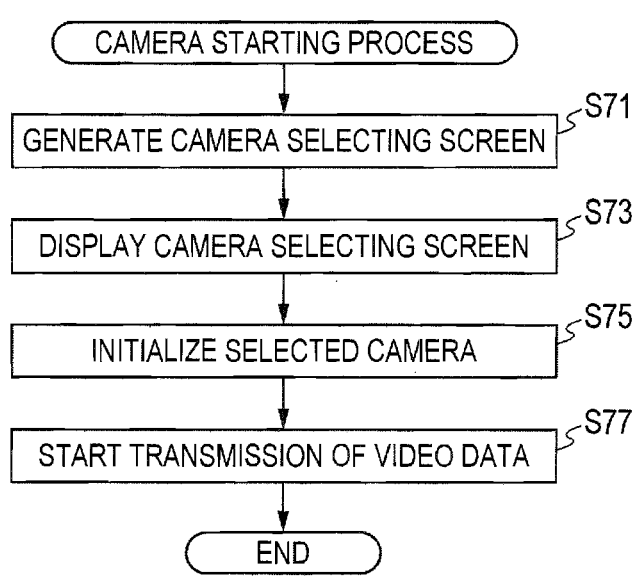
FIG. 7 is a flowchart showing a camera starting process.

(3) In the above-described embodiment, in the camera starting process shown in FIG. 7, the camera selecting screen 70 including the connected camera list is created, and is displayed on the display unit 38 (see S71 and S73 of FIG. 7, FIG. 8). Regarding cameras to be included in the connected camera list, a camera used in an existing conference process may be excluded from the connected camera list. Assume that two cameras 42 and 54 are provided at the terminal apparatus 30 as in the above-described embodiment, and that a conference process is already being executed by using the camera 42. In this case, steps S71 and S73 may be skipped at the second-time startup of the client program, and the CPU 32 may automatically select the camera 54 and execute S75 and the subsequent process, as in the above-described embodiment.

Figure 9:
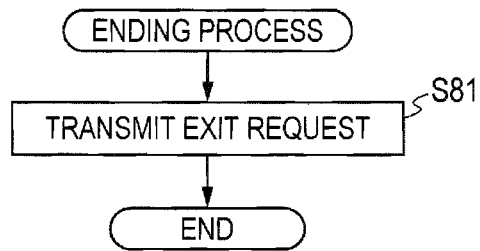
FIG. 9 is a flowchart showing an ending process.

(4) In the above-described embodiment, regarding the ending process shown in FIG. 9, the conference process to be terminated by the termination instruction is the conference process corresponding to the teleconference screen 60 for which a closing operation has been performed. The exit request transmitted in the ending process includes the conference ID, the terminal ID, and the process ID associated with one another in the connection file. The conference process to be terminated when a termination instruction is received in a state where a plurality of conference processes is executed may be all the conference processes that are being executed. As mentioned above, the termination instruction is received by a closing operation of the teleconference screen 60 for a particular conference process, out of a plurality of conference processes. In this case, the exit request transmitted in the ending process includes the conference ID and the terminal ID. In the server connecting process shown in FIG. 10, when an exit request is acquired (see S105: Yes in FIG. 10), in S107, the conference ID and the terminal ID matching the conference ID and the terminal ID included in the exit request, as well as the process ID, the audio session ID, and the video session ID associated with these IDs, are deleted from the participant list.

(5) In the above-described embodiment, the process IDs are used as the process information. Alternatively or additionally, other information may be used as process information. For example, the audio session IDs may be used as the process information.

(6) In the above-described embodiment, the terminal IDs are used as the terminal information. Alternatively or additionally, other information, which uniquely identifies the terminal apparatus 30 and the counterpart apparatuses 81, 82, may be used as terminal information. For example, IP addresses and MAC addresses of the terminal apparatus 30 and the counterpart apparatuses 81, 82 may be used as the terminal information.

What is claimed is:

1. A teleconference system comprising a plurality of terminal apparatuses configured to be used for a teleconference, and a server apparatus configured to execute the teleconference, each of the plurality of terminal apparatuses comprising:
a first communicator configured to connect to a network;
a first processor; and
a first memory storing instructions, the instructions, when executed by the first processor, causing a respective terminal apparatus to perform:
a first acquiring operation of acquiring conference information for identifying a teleconference to be connected;
a second acquiring operation of acquiring terminal information for identifying the respective terminal apparatus in the teleconference identified by the conference information acquired by the first acquiring operation;
a third acquiring operation of acquiring process information for identifying a conference process executed by the respective terminal apparatus;
a first transmission controlling operation of transmitting a connection request from the first communicator to the server apparatus, the connection request including the conference information, the terminal information, and the process information, the connection request being a request for connecting to the teleconference identified by the conference information; and
a second transmission controlling operation of transmitting audio data from the first communicator to the server apparatus through a session established, in response to the connection request, between the conference process and the server apparatus, the audio data corresponding to sound collected by a sound collector of the respective terminal apparatus, the server apparatus comprising:
a second communicator configured to connect to the network;
a second processor; and
a second memory storing instructions, the instructions, when executed by the second processor, causing the server apparatus to perform:
a first storing operation of storing the conference information, the terminal information, and the process information in the second memory in association with each other, the conference information, the terminal information, and the process information being included in the connection request transmitted from each of the plurality of terminal apparatuses, the terminal information configured to identify a terminal apparatus that is a transmission source of the connection request;
a fourth acquiring operation of acquiring, through the second communicator, the audio data transmitted from a first terminal apparatus through a session established with a first conference process executed by the first terminal apparatus in response to the connection request from the first terminal apparatus, the first conference process being identified by first process information, and the first terminal apparatus being one of the plurality of terminal apparatuses and being identified by first terminal information; and a third transmission controlling operation of transmitting, from the second communicator, the audio data through a session established with a second conference process executed by a second terminal apparatus identified by second terminal information without transmitting the audio data through a session established with a third conference process executed by the first terminal apparatus, the second conference process being identified by second process information associated with the second terminal information in the second memory, the third conference process being identified by third process information associated with the first terminal information in the second memory, the first, second and third process information being different from each other, the second terminal apparatus being one of the plurality of terminal apparatuses and different from the first terminal apparatus, and the first and second terminal information being associated with same conference information in the second memory.

2. A non-transitory computer-readable storage medium storing a program executable on a server apparatus configured to be connected to a network and configured to execute a teleconference conducted by a plurality of terminal apparatuses via the network, the program comprising:

a first storing instruction of storing conference information, terminal information, and process information in a storage area connected to the server apparatus in association with each other, the conference information, the terminal information, and the process information being included in a connection request transmitted from each of the plurality of terminal apparatuses, the conference information being for identifying a teleconference to be connected, the terminal information being for identifying a terminal apparatus that is a transmission source of the connection request, and the process information being for identifying a conference process executed by each of the plurality of terminal apparatuses;

an audio acquiring instruction of acquiring, through a communicator of the server apparatus connected to the network, the audio data transmitted from a first terminal apparatus through a session established with a first conference process executed by the first terminal apparatus in response to the connection request from the first terminal apparatus, the first conference process being identified by first process information, and the first terminal apparatus being one of the plurality of terminal apparatuses and being identified by first terminal information; and an audio transmission controlling instruction of transmitting, from the communicator, the audio data through a session established with a second conference process executed by a second terminal apparatus identified by second terminal information without transmitting the audio data through a session established with a third conference process executed by the first terminal apparatus, the second conference process being identified by second process information associated with the second terminal information in the storage area, the third conference process being identified by third process information associated with the first terminal information in the storage area, the first, second and third process information being different from each other, the second terminal apparatus being one of the plurality of terminal apparatuses and different from the first terminal apparatus, and the first and second terminal information being associated with the conference information in the storage area.

3. The storage medium according to claim 2, wherein the program further comprises:

a first issuing instruction of issuing terminal information in response to a first issuance request from each of the plurality of terminal apparatuses, and of transmitting the issued terminal information from the communicator to the terminal apparatus that is a transmission source of the first issuance request.

4. The storage medium according to claim 2, wherein the program further comprises:

a second issuing instruction of, in response to a second issuance request from each of the plurality of terminal apparatuses, issuing the process information, and of transmitting the issued process information from the communicator to the terminal apparatus that is a transmission source of the second issuance request.

5. The storage medium according to claim 2, wherein each of the conference information, the terminal information, and the process information is included in the connection request.

6. The storage medium according to claim 2, wherein the audio transmission controlling instruction further comprises:

transmitting the audio data through the session established with the second conference process without transmitting the audio data through either the session established with the third conference process or a session established with a fourth conference process executed by the second terminal apparatus, the fourth conference process being identified by fourth process information associated with the second terminal information in the storage area, the fourth process information being different from the first, second and third process information.

7. The storage medium according to claim 6, wherein the program further comprises:

a video acquiring instruction of acquiring, through the communicator, video data transmitted from each of the plurality of terminal apparatuses through the session established with the conference process executed by each of the plurality of terminal apparatuses in response to the connection request from each of the plurality of terminal apparatuses; and a video transmission controlling instruction of transmitting, from the communicator, the video data acquired by the video acquiring instruction through the session established with the second conference process without transmitting the video data through the session established with the fourth conference process.

* * * * *